US009055800B2

(12) United States Patent
Harvie

(10) Patent No.: US 9,055,800 B2
(45) Date of Patent: *Jun. 16, 2015

(54) HAIR ACCESSORY AND METHOD OF STYLING HAIR

(71) Applicant: Philis A Harvie, Calgary (CA)

(72) Inventor: Philis A Harvie, Calgary (CA)

(73) Assignee: PONY-O/RIOT INC., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/904,019

(22) Filed: May 29, 2013

(65) Prior Publication Data

US 2014/0041680 A1 Feb. 13, 2014

Related U.S. Application Data

(63) Continuation of application No. 12/033,552, filed as application No. PCT/US2006/024096 on Jun. 20, 2006, which is a continuation-in-part of application No. 11/157,232, filed on Jun. 20, 2005.

(51) Int. Cl.
*A45D 8/00* (2006.01)
*A45D 8/36* (2006.01)
*A45D 8/34* (2006.01)
*G09B 19/00* (2006.01)

(52) U.S. Cl.
CPC .. *A45D 8/36* (2013.01); *A45D 8/34* (2013.01); *G09B 19/0076* (2013.01)

(58) Field of Classification Search
USPC ................. 132/273, 245, 246; 2/271, 207
See application file for complete search history.

(56) References Cited

U.S. PATENT DOCUMENTS

| 346,170 | A | * | 7/1886 | Guild ............................. 83/580 |
| 1,916,943 | A | * | 7/1933 | Beadle .......................... 132/246 |
| 5,042,513 | A | * | 8/1991 | Ferguson ...................... 132/247 |
| 5,771,907 | A | * | 6/1998 | Dickson ........................ 132/247 |
| 6,189,543 | B1 | * | 2/2001 | Sonstegard ................... 132/275 |
| 6,397,854 | B1 | * | 6/2002 | Bailey .......................... 132/200 |
| 7,331,353 | B2 | * | 2/2008 | Harvie .......................... 132/273 |

* cited by examiner

*Primary Examiner* — Robyn Doan
(74) *Attorney, Agent, or Firm* — Dinsmore & Shohl LLP

(57) ABSTRACT

A hair accessory for receiving and retaining a bundle of hair, a method of making such a hair accessory, and methods of styling hair and instructing others to style hair using such a hair accessory are provided. The hair accessory comprises a thin, resilient, continuously formed, ductile metallic member. The continuously formed ductile metallic member is covered by at least one thin sheet-like backing member. The ductile metallic member and the one or more backing members form an opening for receiving and retaining a bundle of hair.

21 Claims, 22 Drawing Sheets

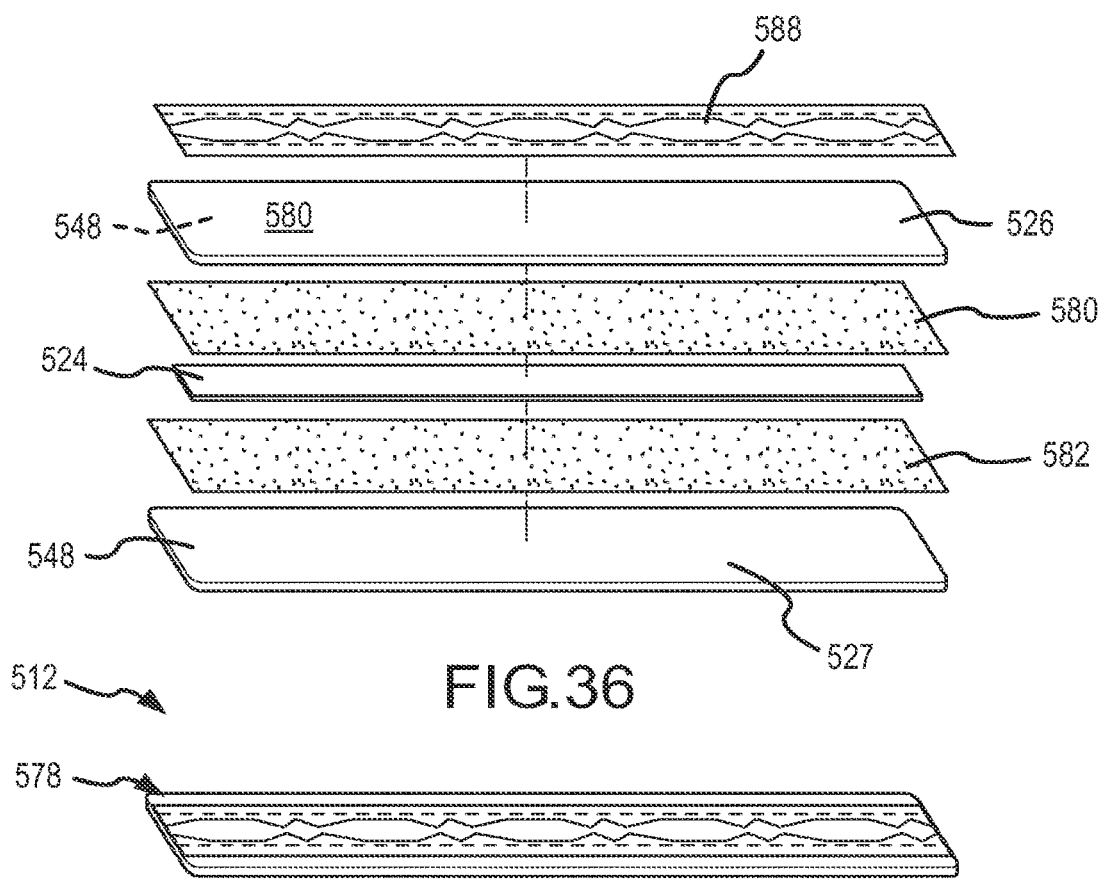
FIG.36
FIG.37
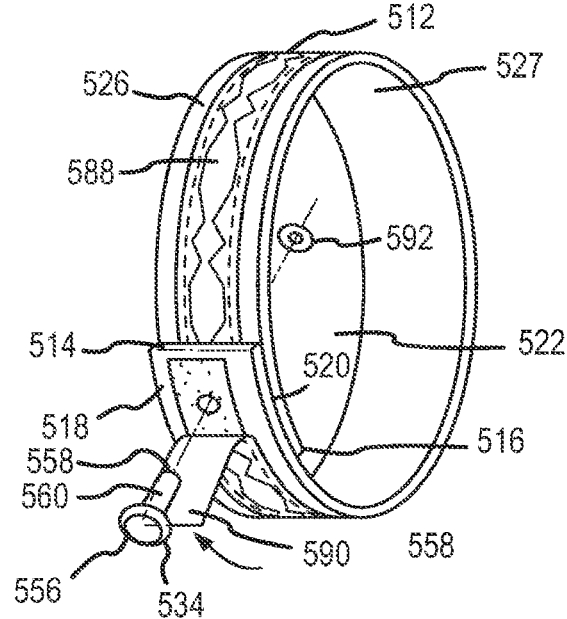
FIG.38

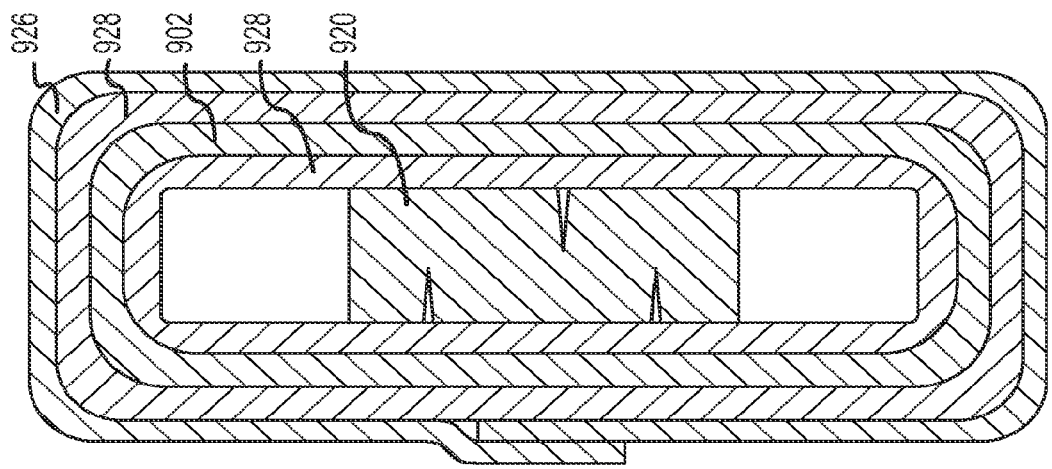
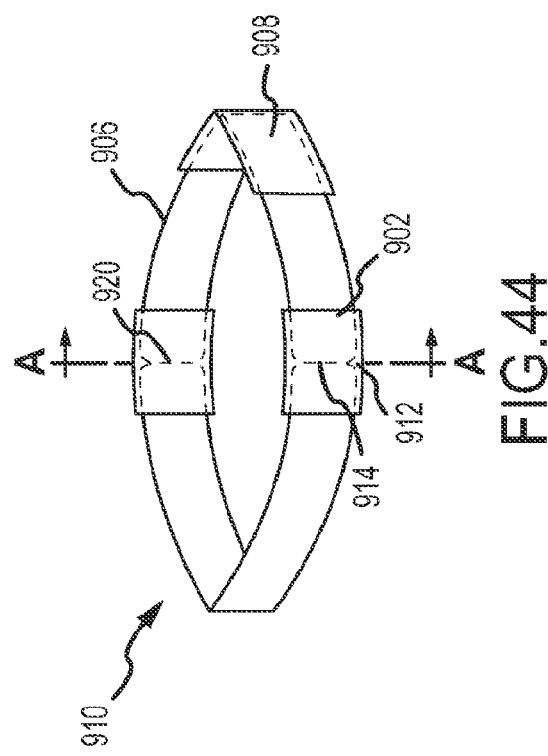
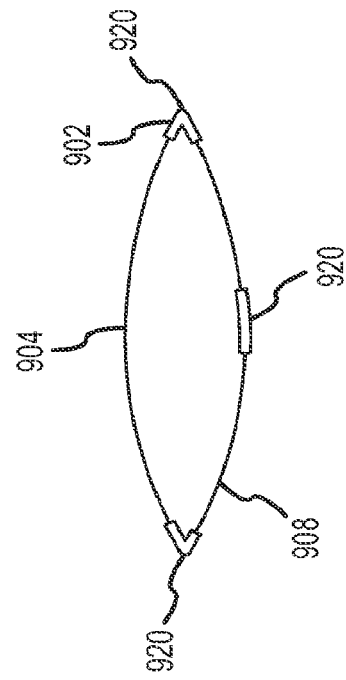

HAIR ACCESSORY AND METHOD OF STYLING HAIR

CROSS-REFERENCE TO RELATED APPLICATIONS

This application is a continuation of U.S. patent application Ser. No. 12/033,552 entitled "Hair accessory and method of styling hair" filed on Feb. 19, 2008 by Philis A. Harvie, which is a National Stage application of PCT international application number PCT/US2006/24096 entitled "Hair accessory and method of styling hair" filed by Philis A. Harvie on 20 Jun. 2006, both the U.S. Ser. No. 12/033,552 application and the PCT/US2006/24096 international application are incorporated by reference as though fully set forth herein. This application is also a continuation-in-part of U.S. patent application Ser. No. 11/157,232 entitled "Hair accessory and method of styling hair" filed by Philis A. Harvie on 20 Jun. 2005, which application is incorporated by reference as though fully set forth herein. This application is related to U.S. Pat. No. 4,892,110 entitled "Hair Wrap Device" and issued to Philis A. Harvie on 9 Jan. 1990. This United States patent is hereby incorporated by reference as though fully set forth herein. This application is also related to U.S. application Ser. No. 12/559,445 entitled "Hair accessory and method of styling hair" filed by Philis A. Harvie on 14 Sep. 2009.

BACKGROUND OF THE INVENTION a. Field of the Invention

The instant invention relates to a hair accessory, a method of making such a hair accessory, a method of styling hair using such a hair accessory, and a method of instructing others to style hair using such a method of styling hair. More particularly, the instant invention relates to a hair accessory containing a ductile metallic member continuously formed or generally configured with overlapping or abutting ends to form an opening for receiving a bundle of hair and to retain the hair in the bundle.

b. Background Art

Numerous known devices exist for wrapping about a bundle of human hair to retain the hair in a bundle. One such example is the elastic band which is commonly used to encircle a bundle of hair to retain it in the bundle and away from the wearer's eyes. Such a device, although inexpensive, lacks any capability for attaching decorative strips thereto for ornamental purposes and for disguising the appearance of the elastic band, which, for aesthetic purposes, is undesirable.

Other devices, such as a two-element hair clip device hinged together at one end, with provision for releasably locking the elements together at the other end, is known. Such devices offer the advantage of being able to provide a surface to which a decorative member may be attached for ornamental purposes. However, such devices provide only a single mode or manner in which they may be attached to the hair, and may be relatively expensive to manufacture depending on the size of the hair clip and complexity of the hinge mechanism.

Ductile metallic members located in sheet-like backing members for wrapping about plastic bags are also known. The common twist-tie for use in wrapping, and twisting to ensure locking, about the mouth of polyurethane bags is one such common household example. The ductile metallic members contained therein are circular ductile wire elements, and usually of a ferrous metal to ensure sufficient tensile strength when stresses are induced through twisting of such twist-tie. It is the common practice in the manufacture of such twist-tie devices to sandwich the ductile wire element between two sheet-like strips of treated paper-like material, primarily to allow such twist-tie members to be easily grasped and separated from one another.

Disadvantages in applying such twist-tie devices for use as an ornamental hair wrap as contemplated in the present invention include the fact that such devices invariably are of a construction wherein a silhouette of the circular ductile wire element protrudes through the surface of the paper-like backing material, creating a cylindrical raised outline throughout the length of the twist-tie. This configuration, in addition to being aesthetically unpleasing when used as a hair wrap, further deprives the twist-tie device of a uniform flat surface to which a decorative ornamental strip or cover member may easily be applied and positively retained thereon despite flexure and coiling of the hair wrap device.

In addition, the sheet-like backing member employed in twist-ties is of paper-like material, or a material lacking any resistance to flexure. Accordingly, during use, the backing member would frequently become folded over along an axis parallel to the circular ductile wire element, and may even become folded unintentionally about the circular wire element, since the paper-like backing member was totally lacking in any resistance to flexure. Although this occurrence is relatively unimportant where the twist-tie is used as a bag closure means, and is even desirable to allow the twist-tie member to be twisted about its ends to allow locking of the twist-tie, it is most clearly undesirable for use in a hair wrap device for two reasons.

First, the hair wrap device of the present invention is not desired to be twisted about its ends to retain hair in a bundle, but rather is adapted to be crimped about a bundle of hair. Accordingly, the surface area of backing member contacting the hair is desired to be as great as possible. Any folding of the backing member would thus decrease the surface area of the backing member contacting the bundle of hair.

Second, any folding over of the backing member about the ductile metallic element would also cause folding over of any flexible decorative strip member affixed thereto and accordingly a portion thereof would become hidden from view. This would result in loss of the aesthetic qualities of a decorative hair wrap device, since the decorative strip would appear folded-over along portions of the hair wrap device.

Still further devices, such as strip open-ended, resilient, ductile metallic members for coiling about a bundle of hair are known. In U.S. Pat. No. 4,892,110, for example, a hair wrap device is disclosed for coiling about a bundle of hair. The hair wrap device disclosed in the '110 patent includes a resilient ductile metallic member having a sufficient resistance to bending so that the hair wrap device, when coiled about a bundle of hair, retains the hair in the bundle. The resilient ductile metallic member is substantially flat and located between flat folded-over portions of a backing member. The folded-over portions of the backing member and the resilient ductile metallic member are of substantially equal thickness so that they together form a flat surface, to which a thin, flexible, decorative cover member is attached covering and hiding the resilient ductile metallic member from view.

BRIEF SUMMARY OF THE INVENTION

It is desirable to be able to provide a hair accessory that easily and securely maintains a wearer's hair in a decorative and/or functional configuration. In one embodiment, the present invention comprises a hair accessory for receiving and retaining a bundle of hair. The hair accessory comprises a thin, resilient, generally rectangular, ductile metallic member having a pair of longitudinal ends. The ductile metallic member is covered by at least one thin sheet-like backing member. The ductile metallic member and the one or more backing members are generally configured in a closed loop by folding the longitudinal ends of the covered ductile metallic member into an adjacent and/or overlapping configuration to form an opening for receiving and retaining a bundle of hair.

In another embodiment, a hair accessory for receiving and retaining a bundle of hair comprises a continuously formed, thin, resilient ductile metallic member. The continuously formed ductile metallic member is covered by at least one thin sheet-like backing member. The continuously formed ductile metallic member and the one or more backing members are generally configured in a closed loop formed by the continuously formed ductile metallic member and together form an opening for receiving and retaining a bundle of hair.

In yet another embodiment, the present invention comprises a method of making such a hair accessory, and further comprises methods of styling hair and instructing others to style hair using such a hair accessory.

The foregoing and other aspects, features, details, utilities, and advantages of the present invention will be apparent from reading the following description and claims, and from reviewing the accompanying drawings.

BRIEF DESCRIPTION OF THE DRAWINGS

FIGS. 36-38 are isometric views depicting steps for assembling the hair accessory of FIG. 34.

FIG. 44 is an isometric view of a hair accessory according to a sixth embodiment of the present invention.

FIG. 45 is a cross-section view of the hair accessory of FIG. 44 taken along section line 45-45 of FIG. 44.

FIG. 46 is an isometric view of the hair accessory of FIG. 44 after being partially crimped.

DETAILED DESCRIPTION OF THE INVENTION

The present invention relates to a hair accessory for receiving and retaining a bundle of hair, to a method of making such a hair accessory, and to methods of styling hair and instructing others to style hair using such a hair accessory. The hair accessory comprises a thin, resilient ductile metallic member, which is continuously formed or comprises a generally rectangular ductile metallic member having a pair of longitudinal ends. The ductile metallic member is covered by at least one thin sheet-like backing member. The ductile metallic member and the one or more backing members are generally configured in a closed loop either by the continuously formed ductile metallic member or by folding the longitudinal ends of the covered ductile metallic member into an adjacent and/or overlapping configuration to form an opening for receiving and retaining a bundle of hair.

Figure 1:
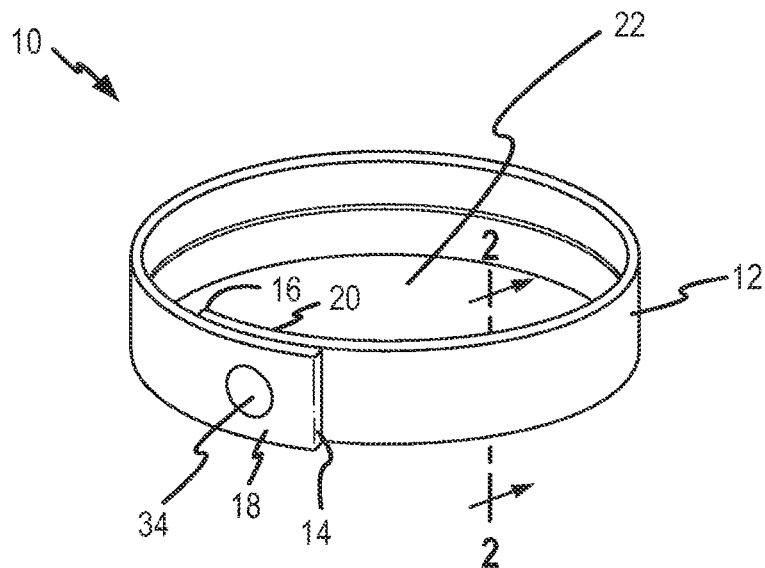
FIG. 1 is an isometric view of a hair accessory according to a first embodiment of the present invention.
Figure 2:
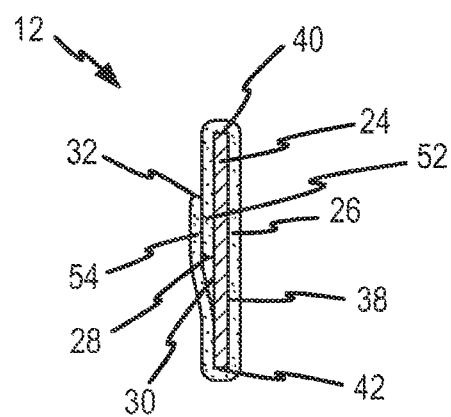
FIG. 2 is a cross-sectional view of the hair accessory of FIG. 1 taken along section line 2-2 of FIG. 1.

FIG. 1 is an isometric view of a hair accessory 10 according to a first embodiment of the present invention. FIG. 2 shows a cross-sectional view of the hair accessory 10 shown in FIG. 1 taken along section line 2-2. In this embodiment, the hair accessory 10 comprises a band 12 having a first longitudinal end 14, a second longitudinal end 16, a first longitudinal end region 18, and a second longitudinal end region 20. In this embodiment, the first longitudinal end region 18 and the second longitudinal end region 20 overlap each other, thereby forming an opening 22 for receiving a bundle of hair. The band 12 of the hair accessory 10 comprises a thin, generally rectangular, substantially flat, resilient, ductile metallic member 24 covered by a thin, sheet-like, substantially rectangular backing member 26. As shown in FIG. 2, the backing member 26 is wrapped completely around the ductile metallic member 24 to enclose and protect the ductile metallic member 24 and to protect a wearer's hair from the ductile metallic member.

Figure 7:
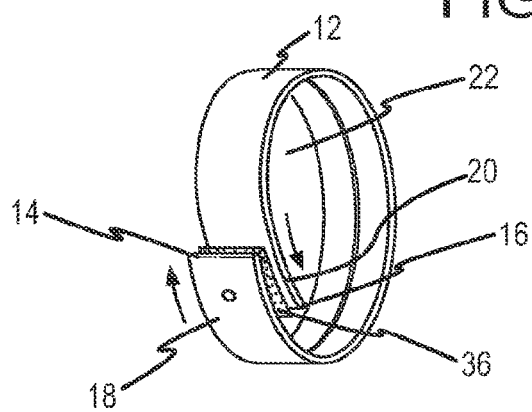

In this first embodiment, the backing member 26 comprises a first lateral edge 28 (see FIGS. 2 and 5) lying adjacent to a top surface 30 of the ductile metallic member 24, and a second lateral edge 32 overlapping the first lateral edge 28 of the backing member 26. The first longitudinal end region 18 and the second longitudinal end region 20 are maintained in their overlapping configuration by a means for connecting the first and second longitudinal end regions 18 and 20, respectively. In the embodiment shown in FIG. 1, for example, the means for connecting the first and second longitudinal end regions 18 and 20 comprises a rivet 34. In some embodiments, such as shown in FIGS. 23, 28, 33, 38, and 43 and described in further detail below, a washer may be used in conjunction with the rivet 34 between an end of the rivet 34 and the band 12 of the hair accessory 10 to disperse forces applied to the ductile metallic member 24 and the backing member 26 of the band 12 end of the rivet 34. In such an embodiment, for example, the washer may prevent the end of the rivet 34 from pulling through the ductile metallic member 24, especially where the ductile metallic member 24 comprises a soft metallic material such as copper that is easily pierced. Other means for connecting the first and second longitudinal end regions 18 and 20, such as, but not limited to, at least one of a bolt and a nut, adhesive, tape, two-sided tape, weld, fuse, heat stake, stitch, hook and loop fastener, staple, or any combination thereof, may be used within the scope of the present invention.

Where the means for connecting the first and second longitudinal end regions 18 and 20 comprises an attachment mechanism that allows the overlapping longitudinal end regions to rotate relative to each other (e.g., a rivet or a bolt and a nut), the means for connecting the first and second longitudinal end regions may additionally comprise a means for securing the longitudinal end regions to restrain the overlapping end regions from rotating relative to each other about the attachment mechanism. A layer 36 of two-sided tape or adhesive, for example, may be disposed between the longitudinal end regions to affix the overlapping first and second longitudinal end regions to each other as shown in FIG. 7. It has been found that by restraining the longitudinal end regions 18 and 20 from rotating about this rivet or other connector, the ductile metallic member 24 is less likely to fracture and potentially cause a failure of the hair accessory 10. Another possible means for securing the overlapping longitudinal end regions 18 and 20 together may comprise a piece of tape wrapped about the end regions to restrain the first longitudinal end region from rotating with respect to the second longitudinal end region (see, e.g., FIGS. 16 and 17). Where a rivet or other connector extends through the first and second longitudinal end regions, the piece of tape may be wrapped about the overlapping longitudinal end regions before and/or after the rivet or other attachment mechanism is inserted through the overlapping longitudinal end regions. Again, wrapping the overlapping longitudinal end regions restrains the longitudinal end regions from rotating with respect to each other about the rivet or other connector extending through the longitudinal end regions. The means for securing the longitudinal end regions may also comprise at least one of a bond, weld, fuse, stitching, or any combination thereof, otherwise securing the first longitudinal end region to the second longitudinal end region to restrain the overlapping end regions from rotating with respect to each other.

Figure 56:
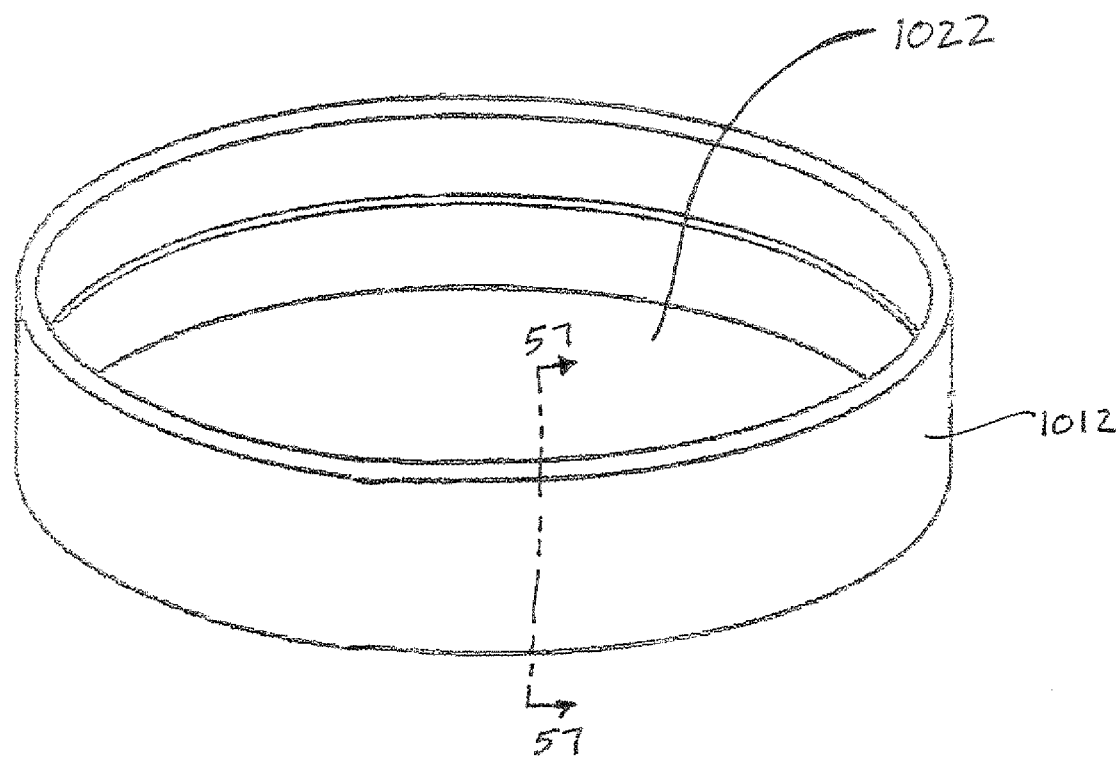
FIG. 56 is an isometric view of a variant of the hair accessory shown in FIG. 1.
Figure 57:
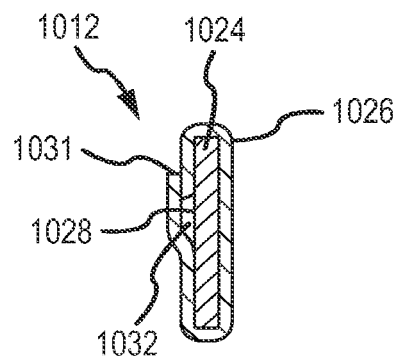
FIG. 57 shows a cross-sectional view of the hair accessory shown in FIG. 56.
Figure 58:
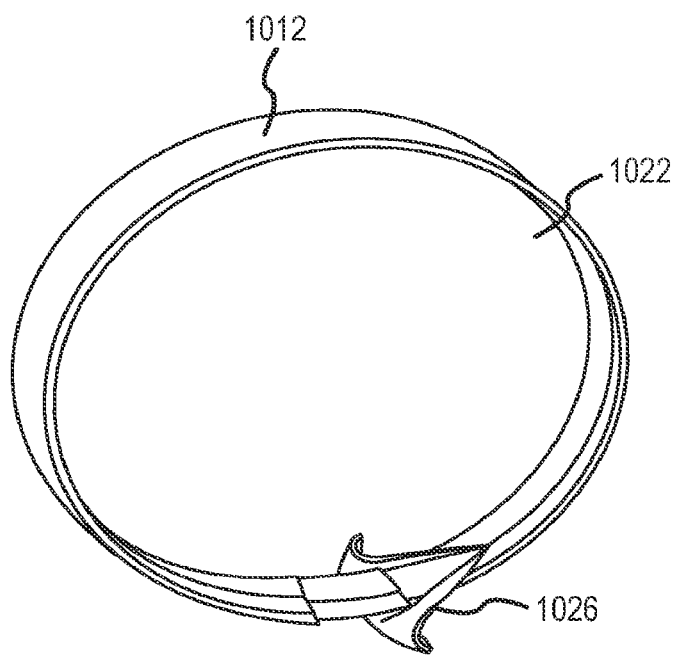
FIG. 58 is an isometric view of the hair accessory shown in FIG. 56 during an assembly process.

In a variant of the first embodiment shown in FIGS. 1 and 2, the hair accessory 1000 for receiving and retaining a bundle of hair comprises a continuously formed, thin, resilient ductile metallic member as shown in FIG. 56. The continuously formed ductile metallic member, for example, may be molded (e.g., poured or injected into a mold) or otherwise continuously formed (e.g., cut into sections from a pipe or tube formed from a ductile metallic member). The continuously formed ductile metallic member is covered by at least one thin sheet-like backing member to form a continuous band 1012 that defines an opening 1022 for receiving and retaining a bundle of hair. FIG. 57 shows a cross-sectional view of the band 2012 taken along section line 57-57 of FIG. 56 in which the continuously formed ductile metallic member 1024 covered by a thin, sheet-like, substantially rectangular backing member 1026. As shown in FIG. 57, the backing member 1026 is wrapped completely around the ductile metallic member 1024 to enclose and protect the ductile metallic member 1024 and to protect a wearer's hair from the ductile metallic member. In this variant of the first embodiment, the backing member 1026 comprises a first lateral edge 1028 (see also FIGS. 2 and 5) lying adjacent to a top surface 1030 of the ductile metallic member 1024, and a second lateral edge 1032 overlapping the first lateral edge 1028 of the backing member 1026. FIG. 58 shows the backing member 1026 being wrapped around the continuously formed ductile metallic member 1024 as described below with reference to FIGS. 3-8 to form the band 1012 that defines the opening 1022.

Figure 3:
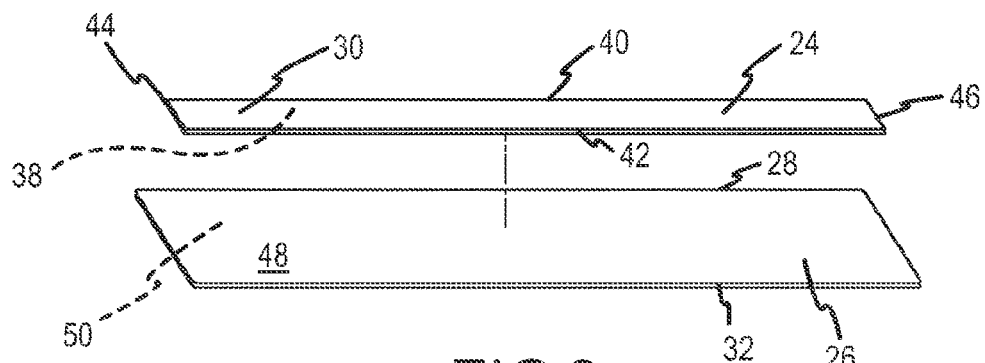
FIGS. 3-8 are isometric views depicting steps for assembling the hair accessory of FIG. 1.
Figure 4:
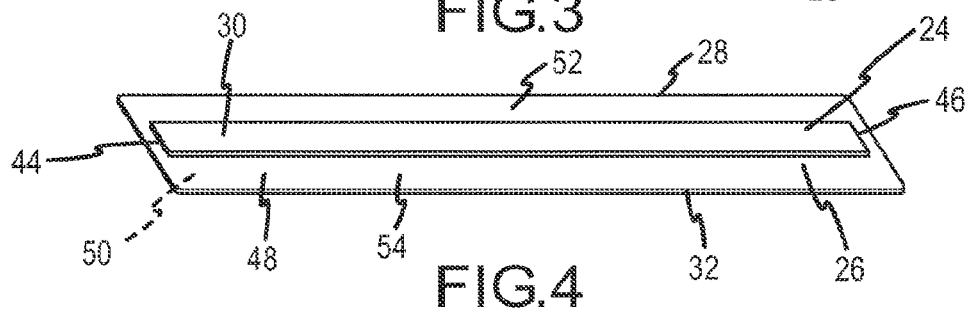

FIGS. 3-8 are isometric views depicting steps of a method for manufacturing the hair accessory 10 shown in FIGS. 1 and 2. As shown in FIG. 3, the generally rectangular, ductile metallic member 24 and the thin, sheet-like backing member 26 are provided. The ductile metallic member 24 is placed adjacent to the backing member 26. As shown in FIG. 3, the ductile metallic member 34 comprises a bottom surface 38 placed adjacent to the backing member 26, a top surface 30 located opposite the bottom surface 38, a pair of lateral side edges 40 and 42, and a pair of longitudinal ends 44 and 46. The pair of lateral side edges 40 and 42 and the pair of longitudinal ends 44 and 46 extend between the bottom surface 38 and the top surface 30 of the ductile metallic member 24. The backing member 26 comprises an inner surface 48 shown facing upwardly towards the ductile metallic member 24, an outer surface 50 facing oppositely from the inner surface 48, and a pair of lateral flaps 52 and 54 extending beyond the pair of lateral side edges 40 and 42 of the ductile metallic member 24.

In one embodiment, a layer of adhesive or two-sided tape is applied to at least a portion of the inner surface 48 of the backing member 26 and/or to at least a portion of the surfaces of the ductile metallic member 24. The layer, for example, may extend over the entire inner surface 48 of the backing member, may extend around at least a portion of the perimeter of the inner surface of the backing member, may be applied to the inner surface of the backing member in a pattern, such as dots, stripes, swirls, or the like, or may be applied randomly to the inner surface of the backing member. The layer allows the backing member to be adhered to the ductile metallic member along at least a portion of the inner surface, such as along the top surface 30, bottom surface 38, and/or lateral side edges 40 and 42 of the ductile metallic member. Alternatively or additionally, the inner surface 48 of the backing member 26 may be attached to the outer surface 50 of the backing member where the pair of lateral flaps 52 and 54 overlap. In another embodiment, the backing member 26 may be attached to the ductile metallic member 24 via welding, fusion, stitching, or the like.

Figure 5:
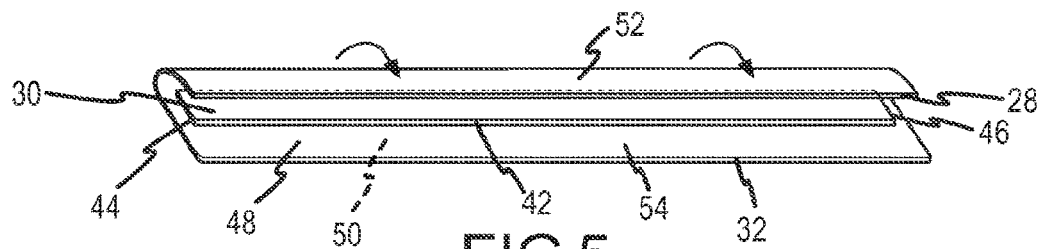
Figure 6:
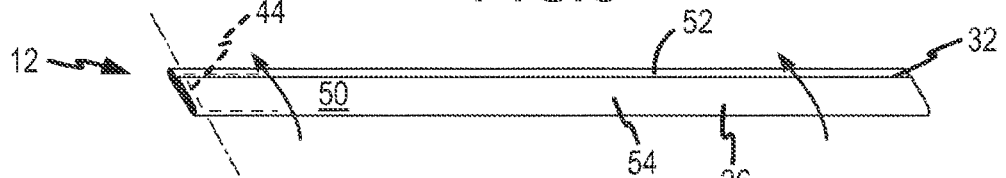

The first lateral flap 52 of the backing member 26 is folded around the first lateral side edge 40 of the ductile metallic member 24 as shown in FIG. 5. The first lateral flap 52 of the backing member 26 may be attached to the top surface 30 of the ductile metallic member 24 or may be merely placed adjacent to the top surface 30 of the ductile metallic member 24 without being attached to the top surface 30 of the ductile metallic member 24. The second lateral flap 54 of the backing member 26 is then wrapped around the second lateral side edge 42 of the ductile metallic member 24 and overlaps the first lateral flap 52 as shown in FIGS. 2 and 6. The second lateral flap 54 may be attached to the first lateral flap 52 and/or to a portion of the surface of the ductile metallic member 24 not covered by the first lateral flap 52 of the backing member 26. As shown in FIG. 6, the backing member 26 may also extend longitudinally past longitudinal ends 44 and 46 of the ductile metallic member 24 to conceal the longitudinal ends.

Although the method shown in FIGS. 3-8 shows two lateral flaps 52 and 54 of the backing member 26 being wrapped around the lateral side edges 40 and 42 of the ductile metallic member 24, the ductile metallic member may alternatively be placed overlapping one lateral flap of the backing member 26 and the other lateral flap of the backing member may be wrapped completely around the ductile metallic member 24 and overlap the first lateral flap of the backing member 26. Also, the first and second lateral flaps 52 and 54 of the backing member 26 could be wrapped about the first and second lateral side edges 40 and 42 of the ductile metallic member 24, respectively, and abut each other adjacent to the top surface 30, the bottom surface 38, or one of the lateral side edges of the ductile metallic member 24. In addition, the backing member 26 may be wrapped around the ductile metallic member 24 in a generally helical manner similar to that of a tennis racquet handle or a bicycle handle bar.

Figure 8:
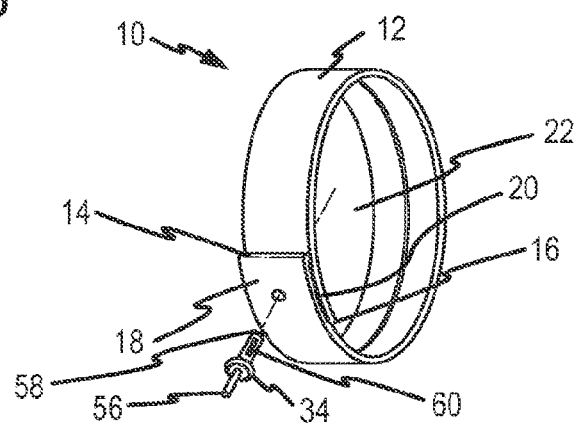

After the lateral flaps 52 and 54 of the backing member 26 have been wrapped around the ductile metallic member 24, the band 12 formed by the ductile metallic member 24 and the backing member 26 is folded, and the longitudinal end regions 18 and 20 of the band 12 are overlapped to form an opening 22 for receiving a bundle of hair as shown in FIGS. 7 and 8. Where the longitudinal end regions are to be secured together as described above, a layer 36 of two-sided tape or adhesive may be applied between the overlapping longitudinal end regions and the longitudinal end regions are secured together along at least a portion of the overlapping region. Alternatively or additionally, a layer of material, such as a piece of adhesive tape, may be wrapped around at least a portion of the overlapping longitudinal end regions to secure the end regions to each other (see, e.g., FIGS. 16 and 17).

Next, the longitudinal end regions 18 and 20 are attached to each other via the rivet 34. The rivet 34 connection of the longitudinal end regions 18 and 20 of the band 12 is shown in an exploded view in FIG. 8. In this view, the rivet 34 comprises a breakstem blind rivet fastener including a stem 56, a head 58, and a shank 60 extending from the stem 56 to the head 58. The head 58 and the shank 60 are extended through the longitudinal end regions of the band. The end of the stem 56 is pulled, retracting the head 58 into the shank 60 until the longitudinal end regions of the band 12 are connected, and the stem 56 fractures and is removed from the rivet 34. Alternatively, the rivet 34 may be a solid, blind, multi-grip, grooved, peel type blind, self-piercing, plastic, tubular type rivet, a multi-piece rivet with a cap, or any other type of rivet known in the art.

Figure 9:
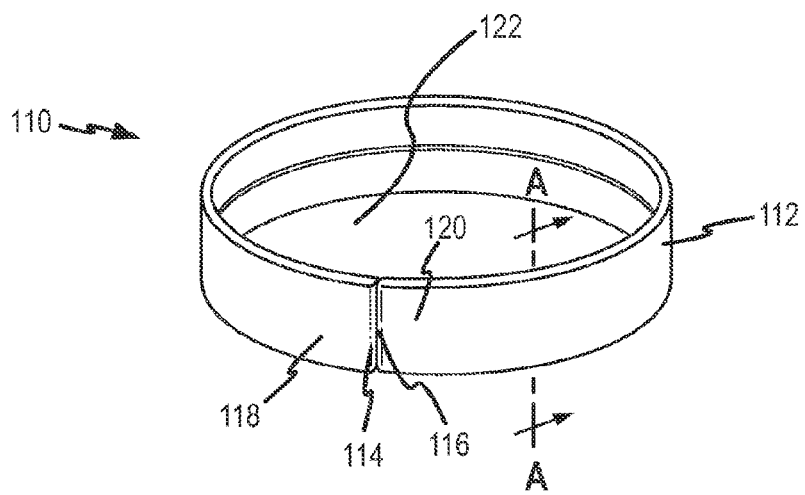
FIG. 9 is an isometric view of a hair accessory according to a second embodiment of the present invention.

FIG. 9 is an isometric view of a hair accessory 110 according to a second embodiment of the present invention. In this embodiment, the hair accessory 110 comprises a band 112 formed by a ductile metallic member 124 covered by a backing member 126. The band 112 comprises a first longitudinal end 114, a second longitudinal end 116, a first longitudinal end region 118, and a second longitudinal end region 120. The band 112 is folded so that the pair of longitudinal ends 114 and 116 abut each other end-to-end and form an opening 122 for receiving a bundle of hair. A cross-section taken along section line A-A shown in FIG. 9 is identical to the cross-section shown for the first embodiment of the hair accessory 10 in FIG. 2.

Figure 10:
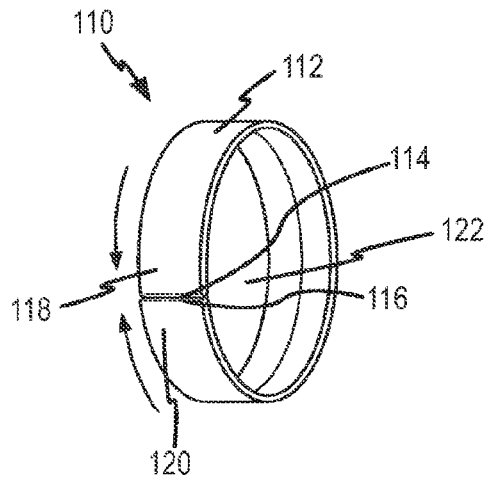
FIG. 10 is an isometric view of a final step for assembling the hair accessory of FIG. 8.

The second embodiment of the hair accessory 110 shown in FIG. 9 may be assembled, for example, via the steps shown in FIGS. 3-6 and 10. In this embodiment, the hair accessory 110 is initially assembled via the same steps as described above with reference to FIGS. 3-6. After the ductile metallic member 124 is wrapped by the backing member 126 as shown in FIG. 6, the band 112 is folded until the two longitudinal ends 114 and 116 abut and are disposed adjacent to each other forming an opening 122 as shown in FIG. 10. The longitudinal ends 114 and 116 of the band 112 may be attached to each other, such as by welding, fusion, adhesion, or the like. Alternatively or additionally, the longitudinal ends may be attached by wrapping them, such as by a piece of tape, to hold them in an adjacent configuration. In another configuration, the band 112 (e.g., the ductile metallic member 124 and/or the backing member 126) may be sufficiently resilient to keep the longitudinal ends 114 and 116 from pulling apart under normal use.

Figure 11:
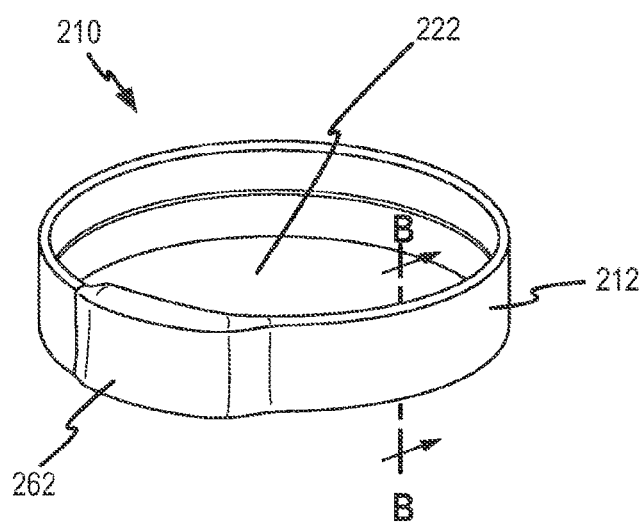
FIG. 11 is an isometric view of a hair accessory according to a third embodiment of the present invention.

FIG. 11 shows an isometric view of a hair accessory 210 according to a third embodiment of the present invention. In this embodiment, the hair accessory 210 comprises a band 212 including a ductile metallic member 224 covered by a backing member 226 (see, e.g, FIGS. 12-15). The band 212 comprises a first longitudinal end 214, a second longitudinal end 216, a first longitudinal end region 218, and a second longitudinal end region 220 (see FIG. 15). The band 212 is folded such that the first longitudinal end region 218 and the second longitudinal end region 220 are disposed in an overlapping configuration to provide an opening 222 for receiving a bundle of hair (see FIG. 16). The cross-sectional view along section line B-B of FIG. 11 is identical to the cross-sectional view shown in FIG. 2.

As described in further detail below with reference to FIGS. 12-18, the backing member 226 covering the ductile metallic member 224 comprises a longitudinal flap 262 that extends beyond a first longitudinal end 244 of the ductile metallic member 224. The longitudinal flap 262 covers both the first longitudinal end region 218 and the second longitudinal end region 220 of the band 212 as well as a rivet 234 connecting the first longitudinal end region 218 and the second longitudinal end region 220 of the band 212 (see, e.g., FIGS. 16-18). The longitudinal flap 262 conceals the longitudinal end regions 218 and 220 and the rivet 234 of the hair accessory 210 and further protects the longitudinal end regions and the rivet from contact with the wearer and the wearer from contact with the longitudinal end regions 218 and 220 and the rivet 234. The longitudinal flap 262, for example, may prevent dirt or oil from accumulating on the rivet 234 and may further prevent hair from being caught on the rivet 234 or between the longitudinal end regions 218 and 220 of the hair accessory 210.

Figure 12:
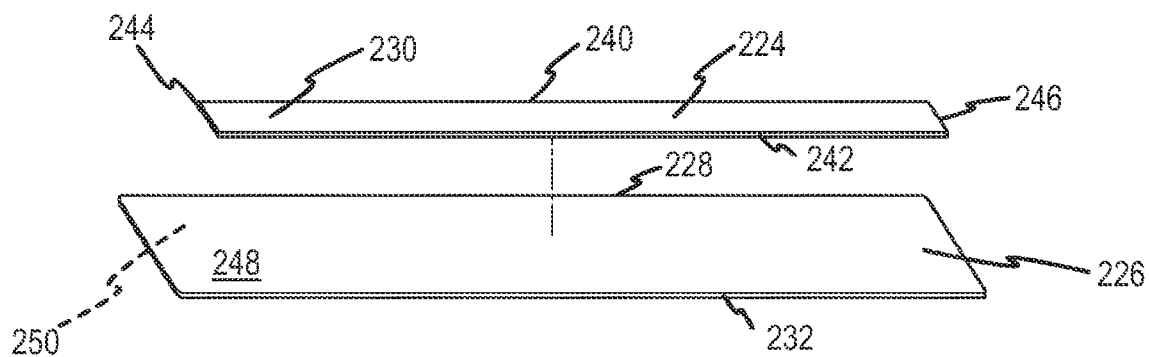
FIGS. 12-18 are isometric views depicting steps for assembling the hair accessory of FIG. 10.
Figure 13:
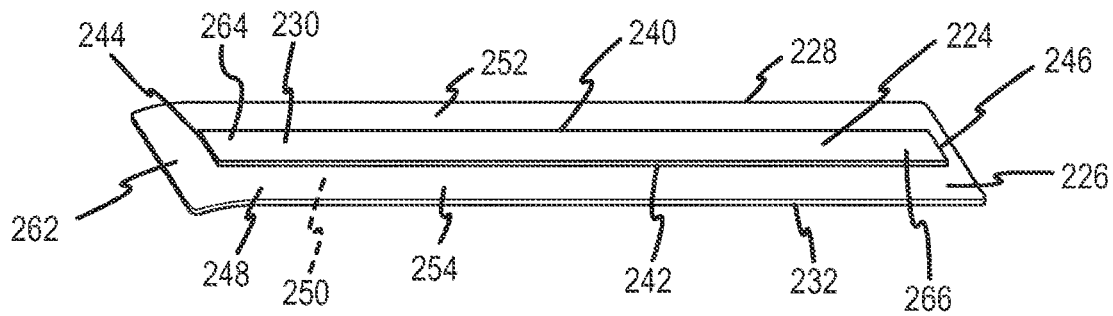
Figure 14:
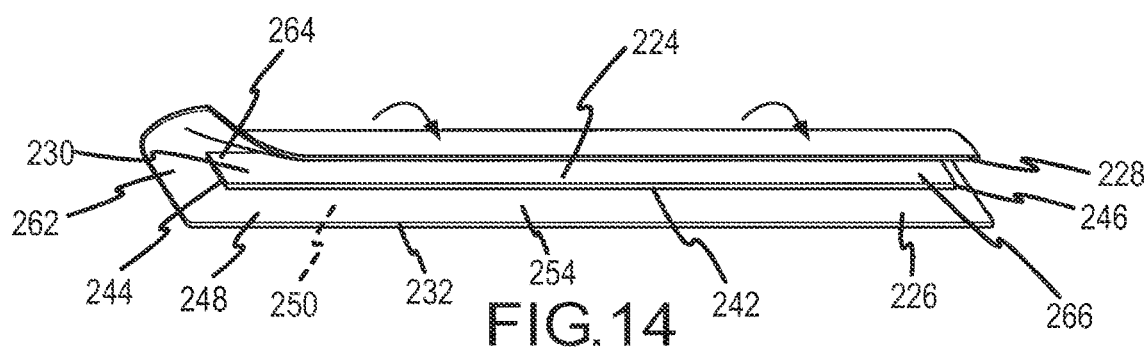
Figure 15:
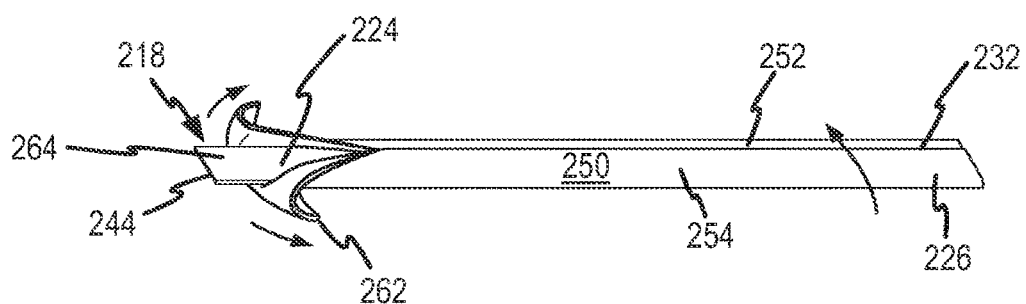

FIGS. 12-18 show isometric views depicting steps for assembling the hair accessory 210 of FIG. 11. As shown in FIGS. 12 and 13, the ductile metallic member 224 is provided and placed adjacent to the backing member 226. The longitudinal flap 262 is formed by a portion of the backing member 226 that extends longitudinally beyond the first longitudinal end 244 of the ductile metallic member 224. A first lateral flap 252 of the backing member 226 is wrapped around a first lateral side edge 240 of the ductile metallic member 224 and disposed adjacent to a top surface 230 of the ductile metallic member 224 as shown in FIG. 14. As described above with respect to FIG. 4, the first lateral flap 252 may be attached to the top surface 230 of the ductile metallic member 224 or may be merely placed adjacent to the top surface 230 of the ductile metallic member 224. A second lateral flap 254 of the backing member 226 is then wrapped around a second lateral side edge 242 of the ductile metallic member 224 overlapping the first lateral flap 252 of the backing member 226 such that the second lateral edge 232 of the backing member 226 overlaps the first lateral side edge 228 of the backing member as shown in FIG. 15. The second lateral flap 254 is then attached to the first lateral flap 252 of the backing member 226 and/or the top surface 230 of the ductile metallic member 224.

Figure 16:
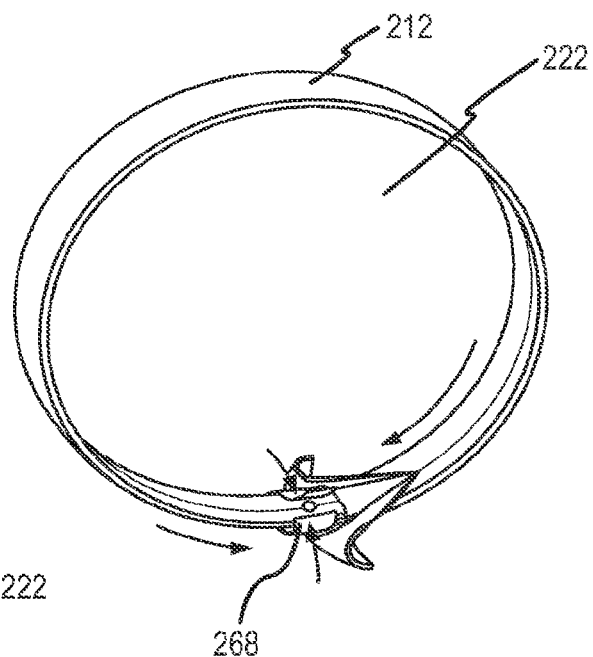
Figure 17:
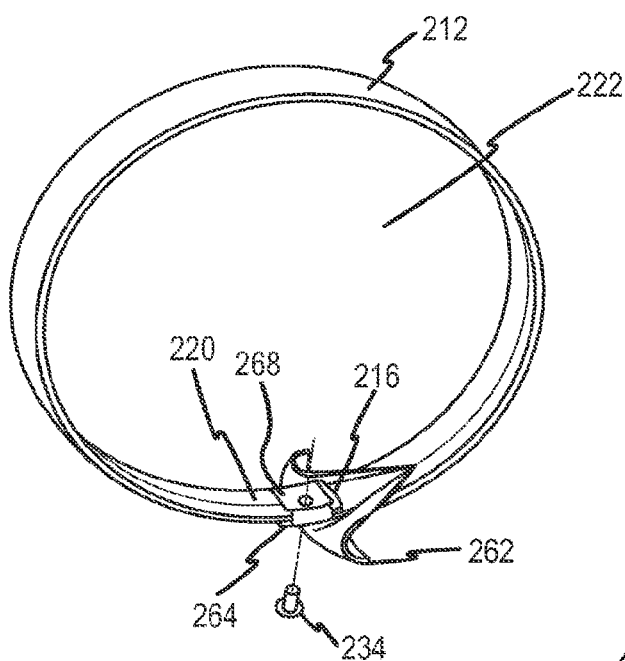
Figure 18:
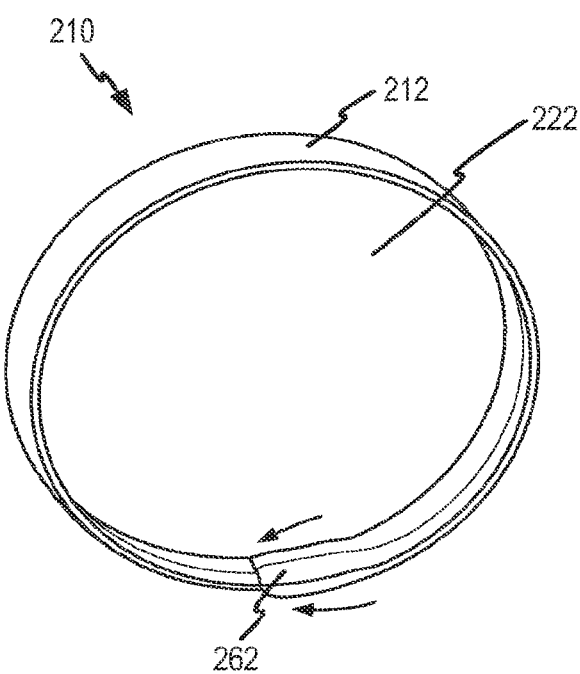

Next, the longitudinal flap 262 formed by a first longitudinal end region of the backing member 226 is peeled back from the first longitudinal end region 218 of the band 212 exposing the first longitudinal end region 264 of the ductile metallic member 224. The covered ductile metallic member is folded, bringing the first exposed longitudinal end region 264 of the ductile metallic member 224 into an overlapping configuration with the covered second longitudinal end region 266 of the ductile metallic member 224 and providing the opening 222 for receiving a bundle of hair as shown in FIG. 16. A piece of material, such as a piece of tape 268, is then wrapped around the overlapping first and second longitudinal end regions to restrain the overlapping longitudinal end regions from rotating with respect to each other. As further shown in FIG. 17, a rivet 234 is used to affix the exposed first longitudinal end region 264 of the ductile metallic member 224 and the covered second longitudinal end region 266 of the ductile metallic member 224 in an overlapping configuration. After the longitudinal end regions 264 and 266 are affixed, the longitudinal flap 262 of the backing member 226 is extended over the exposed first longitudinal end region 264, the covered second longitudinal end region 266, the piece of tape 268, and the rivet 234 as shown in FIG. 18. The longitudinal flap 262 may, for example, be attached via adhesion, fusion, welding, stitching, or the like.

Figure 19:
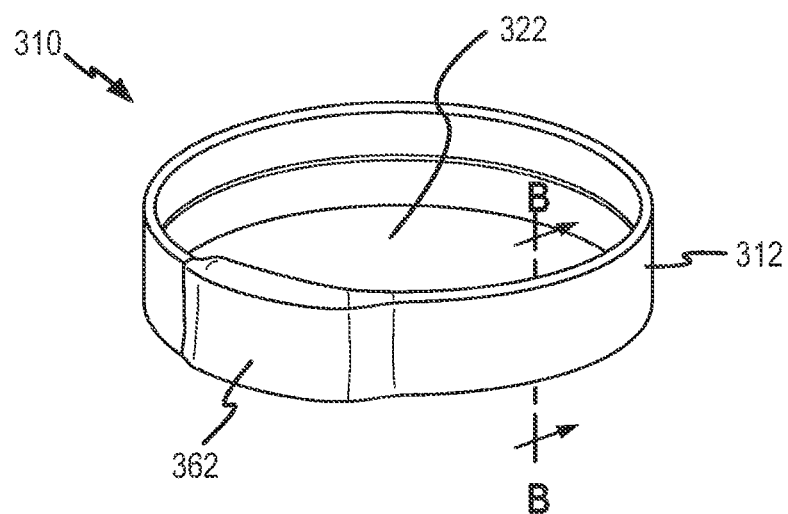
FIG. 19 is an isometric view of a hair accessory according to a fourth embodiment of the present invention.

FIG. 19 is an isometric view of a hair accessory 310 according to a fourth embodiment of the present invention. A cross-section taken along the section line C-C shown in FIG. 19 is identical to the cross-section shown for the first embodiment of the hair accessory in FIG. 2. The hair accessory is similar to the hair accessory shown in FIG. 11.

Figure 20:
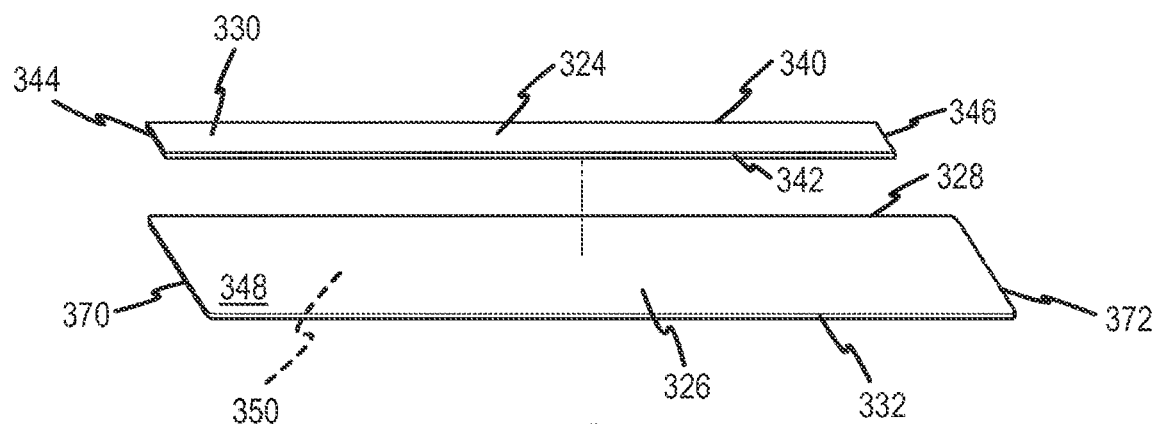
FIGS. 20-23 are isometric views depicting steps for assembling the hair accessory of FIG. 19.
Figure 21:
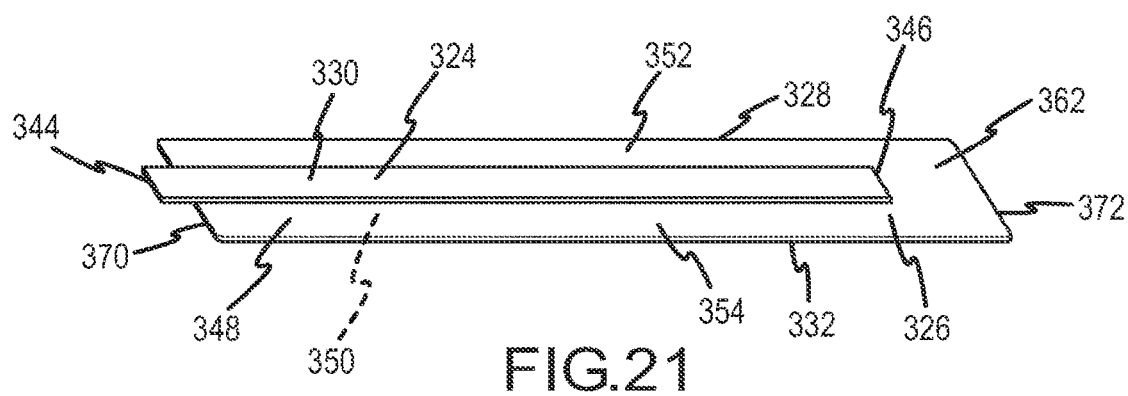
Figure 22:
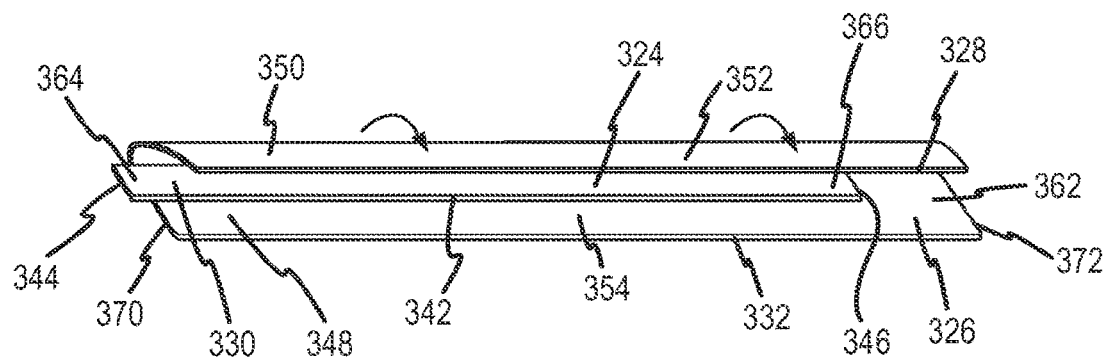

FIGS. 20-23 are isometric views depicting steps for assembling the hair accessory of FIG. 19. As shown in FIG. 20, a ductile metallic member 324 is disposed adjacent to a backing member 326. A first longitudinal end 344 of the ductile metallic member 324 overhangs a first longitudinal end 370 of the backing member 326, and a second longitudinal end 372 of the backing member 326 overhangs a second longitudinal end 346 of the ductile metallic member 324 as shown in FIG. 21. Lateral flaps 352 and 354 of the backing member 326 are wrapped around the ductile metallic member 324 as shown in FIG. 22 and described above with respect to FIGS. 14 and 15. As shown in FIG. 22, the first longitudinal end 344 of the ductile metallic member 324 overhangs the first longitudinal end 370 of the backing member 326 and the second longitudinal end 372 of the backing member 326 forms a longitudinal flap 362 extending beyond the second longitudinal end 346 of the ductile metallic member 324. As described above with respect to FIG. 15, the longitudinal flap 362 of the backing member 326 is peeled back away from the second longitudinal end 346 of the ductile metallic member 324, and the covered ductile metallic member is folded, bringing the first exposed longitudinal end region 364 of the ductile metallic member 324 into an overlapping configuration with the covered second longitudinal end region 366 of the ductile metallic member 324 and providing an opening 322 for receiving a bundle of hair. A rivet 334 is used to affix the exposed first longitudinal end region 364 of the ductile metallic member 324 and the covered second longitudinal end region 366 of the ductile metallic member 324 in an overlapping configuration. In this embodiment, for example, the rivet may comprise a first end 356, a second end 358, and a shank 360 extending from the first end 356 to the second end 358 of the rivet 334. A washer 392 may also be disposed between the inner second longitudinal end region 320 of the band 312 and the second end 358 of the rivet 334 around the shank 360 of the rivet. As described above, the washer 392 disperses the forces applied by the second end 358 of the rivet 334 to the ductile metallic member 324 and the backing member 326 to prevent the second end of the rivet from pulling through the inner second longitudinal end region 320 of the ductile metallic member 324 and/or the backing member 326 and separating the longitudinal end regions 318 and 320 of the band 312.

Figure 23:
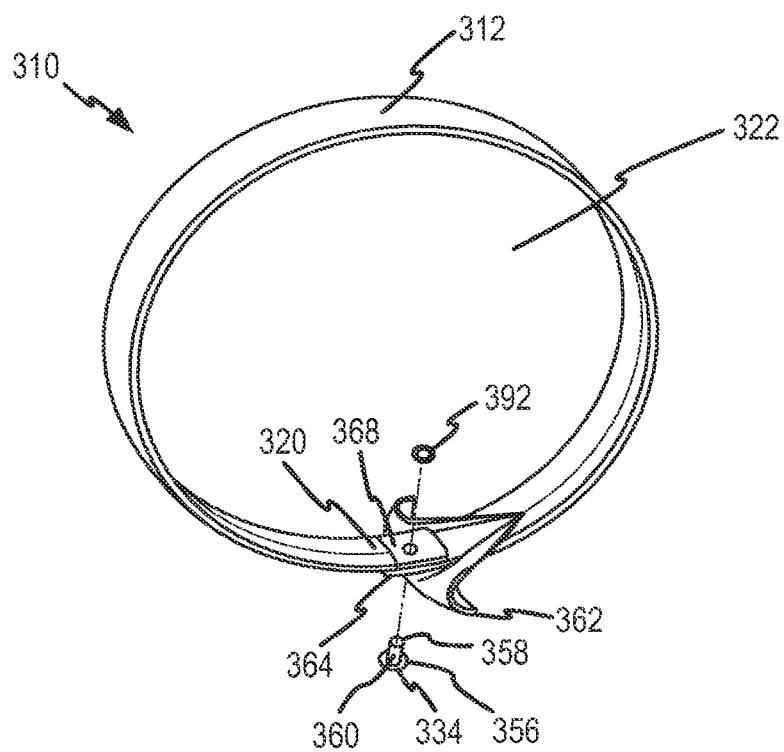

After the longitudinal end regions are affixed, the longitudinal flap 362 of the backing member 326 is extended over the exposed first longitudinal end 364, the covered second longitudinal end 366, and the rivet 334 as shown in FIG. 23. The longitudinal flap 362 may, for example, be attached via adhesion, fusion, welding, stitching, or the like.

Figure 24:
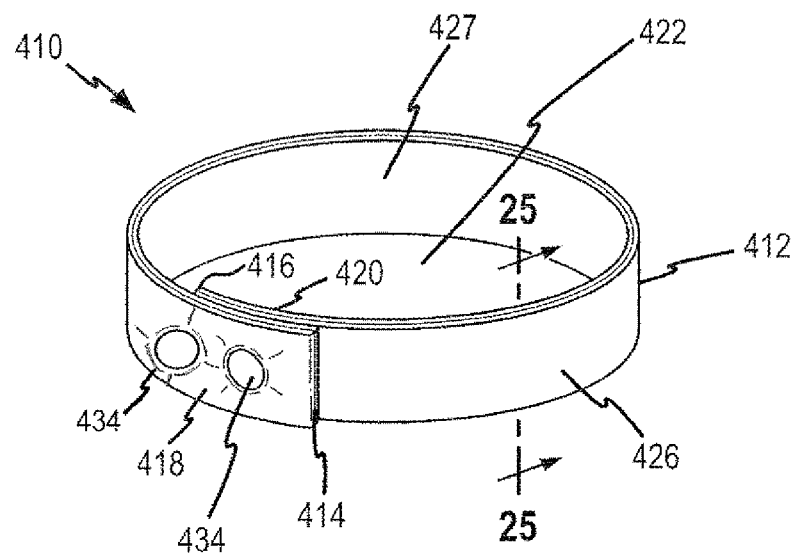
FIG. 24 is an isometric view of a hair accessory according to the fifth embodiment of the present invention.
Figure 25:
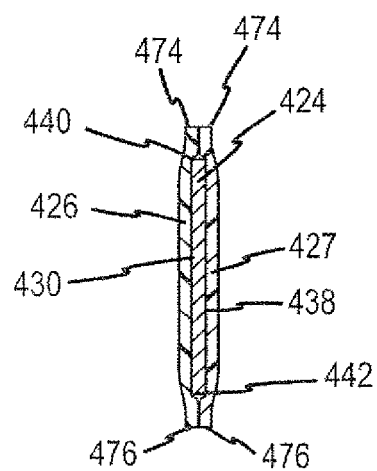
FIG. 25 is a cross-sectional view of the hair accessory of FIG. 24 taken along section line 25-25 of FIG. 24.

FIG. 24 is an isometric view of a hair accessory 410 according to a fifth embodiment of the present invention. FIG. 25 depicts a cross-sectional view of the hair accessory 410 of FIG. 24 taken along section line 25-25 of FIG. 24. The hair accessory 410, in one variant, comprises a waterproof hair accessory in which a ductile metallic member 424 is protected from water or other contaminants by a pair of protective backing members 426 and 427, such as waterproof closed-cell neoprene, polyethylene, or polyurethane foam layers, sandwiched about the ductile metallic member 424. As shown in the cross-sectional view of FIG. 25, a band 412 is formed by a laminate comprising the ductile metallic member 424 enclosed by the pair of backing member 426 and 427. The backing members 426 and 427 are attached to each other along a pair of lateral ends 474 and 476 as shown in FIG. 25 and optionally may also be attached to the top and bottom surfaces 430 and 438 of the ductile metallic member 424. The band 412 comprises a first longitudinal end 414, a second longitudinal end 416, a first longitudinal end region 418, and a second longitudinal end region 420. The band 412 is folded such that the first and second longitudinal end regions 418 and 420 are disposed in an overlapping configuration to provide an opening 422 for receiving a bundle of hair. An attachment device, such as one or more rivets 434, attaches the first and second longitudinal end regions 418 and 420. In the particular variant of FIG. 24, for example, two rivets disposed longitudinally along the band 412. The use of a second or additional rivets serves to restrain rotation of the first longitudinal end with respect to the second longitudinal end.

Figure 26:
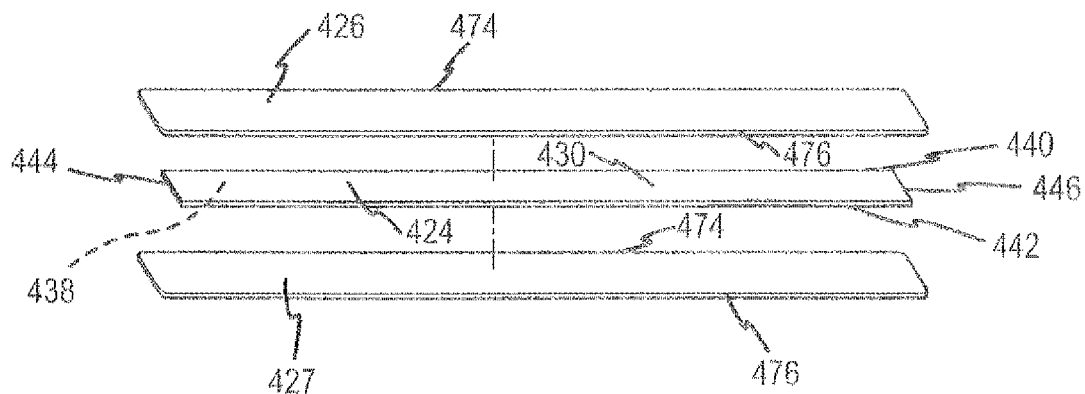
FIGS. 26-28 are isometric views depicting steps for assembling the hair accessory of FIG. 24.
Figure 27:
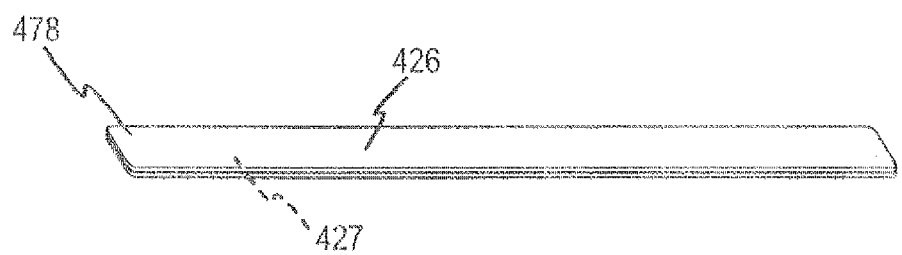
Figure 28:
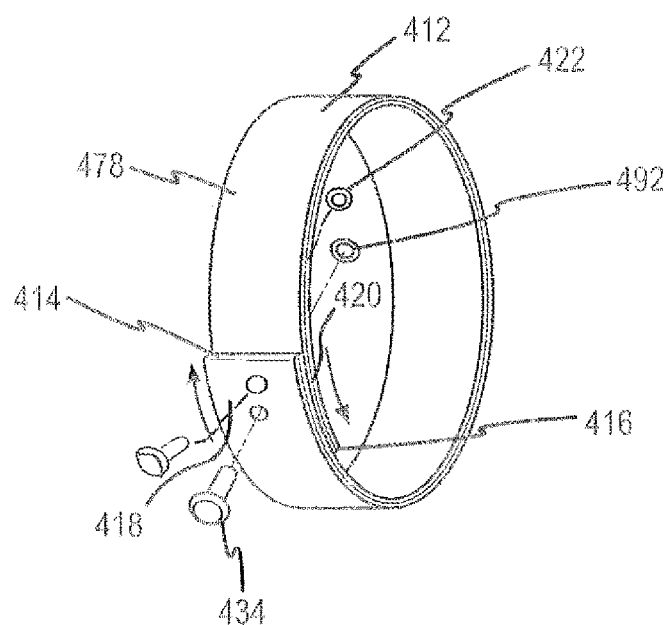

FIGS. 26-28 are isometric views depicting steps for assembling the hair accessory 410 of FIG. 24. As shown in FIG. 19, the generally rectangular ductile metallic member 424 is provided and disposed between the two backing members 426 and 427, such as a pair of closed-cell neoprene, polyethylene, or polyurethane protective layers. In the embodiment shown in FIG. 26, for example, the lateral ends 474 and 476 and the longitudinal ends 470 and 472 of the backing members 426 and 427 extend at least slightly beyond the lateral side edges 440 and 442 and the longitudinal edges 444 and 446 of the ductile metallic member 424, respectively, so that, when attached, the ductile metallic member 424 is completely enveloped by the backing members 426 and 427 (see also FIG. 25).

As shown in FIGS. 26 and 27, the backing members 426 and 427 are attached to each other to form a laminate 478, such as via adhesion, fusion, welding, stitching, or the like, around the perimeter edges 440, 442, 444, and 446 of the ductile metallic member 424 and, optionally, may be attached to a top surface 430 and/or a bottom surface 438 of the ductile metallic member 424. The band 412 formed by the laminate of the backing members 426 and 427 and the ductile metallic member 424 is then folded so that the longitudinal end regions 418 and 420 of the laminate 478 are brought into an overlapping configuration to provide the opening 422 for receiving a bundle of hair as shown in FIG. 28. The longitudinal end regions 418 and 420 of the band 412 are then attached, such as by the pair of longitudinally spaced rivets 434 and the washers 592, such as described above with respect to FIG. 23.

Figure 29:
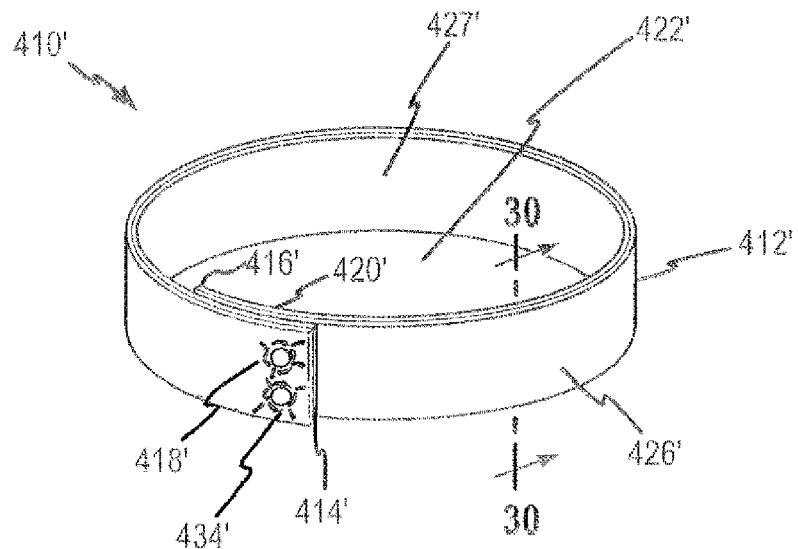
FIG. 29 is an isometric view of a variant of the hair accessory of FIG. 24.
Figure 30:
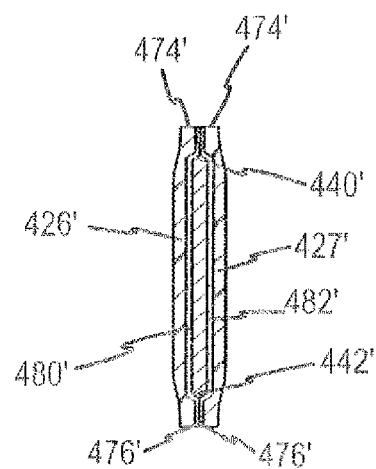
FIG. 30 is a cross-sectional view of the hair accessory of FIG. 29 taken along section line 30-30.

FIG. 29 is an isometric view of a variant 410' of the hair accessory 410 shown in FIG. 24. In this variant, a first longitudinal end 414' is secured to the second longitudinal end 416' of the band 412 by a pair of laterally spaced rivets 434'. As described above, the second rivet restrains the first longitudinal end from rotating with respect to the second longitudinal end. FIG. 30 shows a cross-sectional view of the hair accessory 410' taken along section line 30-30 of FIG. 29. As described above, the hair accessory 410' comprises a band 412' formed by a laminate 478' comprising a ductile metallic member 424' sandwiched between a pair of backing members 426' and 427'. In this variant, layers 480 and 482 of two-sided tape are disposed along each inner surface 448 of the backing members 426' and 427'. Although the variant shown in FIGS. 29 and 30, comprise layers 480 and 482 of two-sided tape extending completely across a width of the inner surface 448' of each backing member from a first lateral edge 428' of each backing member to a second lateral edge 432' of each backing member, the layers of two-sided tape may only extend a portion of the width between the first lateral edge 428' and the second lateral edge 432' of the backing members 426' and 427'. As shown in FIG. 30, layers 480 and 482 of the two-sided tape attach the inner surface 448' of each backing member to the ductile metallic member 424' and further connect the outer lateral edge portions 484 and 486 of the backing members to each other.

Figure 31:
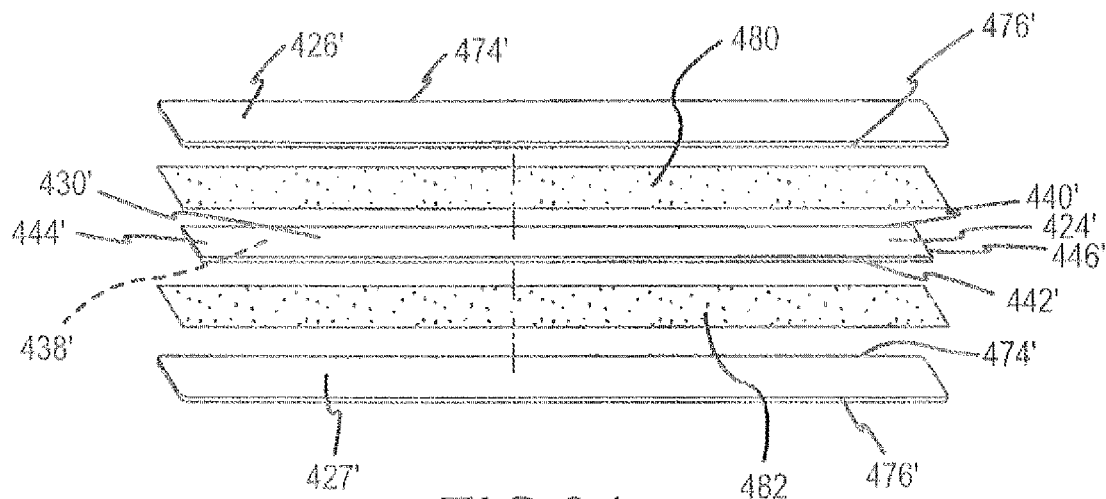
FIGS. 31-33 are isometric views depicting steps for assembly the hair accessory of FIG. 29.
Figure 32:
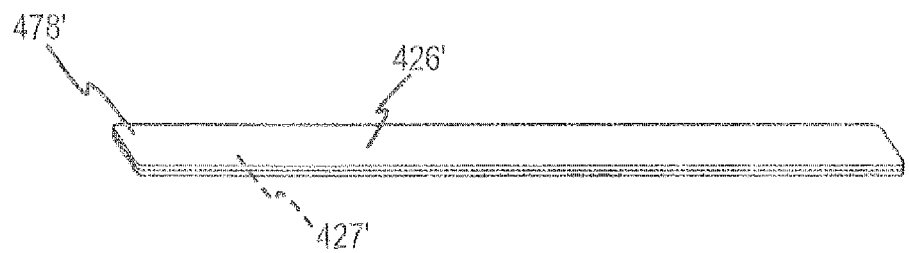
Figure 33:
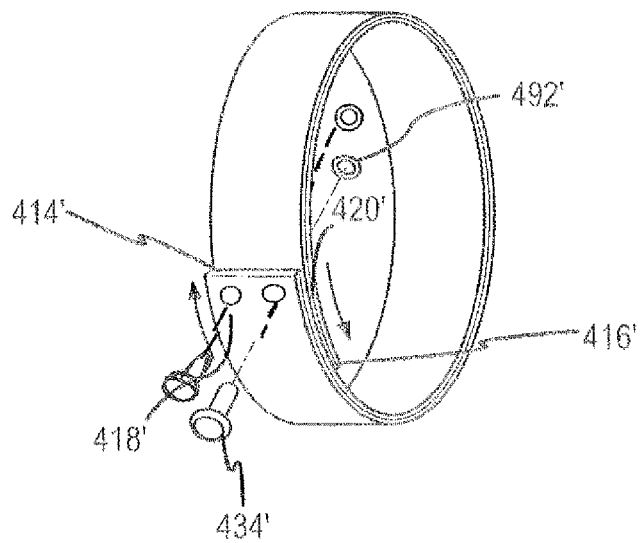

FIGS. 31-33 are isometric views depicting steps for assembling the hair accessory 410' of FIG. 29. As shown in FIG. 31, the generally rectangular ductile metallic member 424' is provided and disposed between two layers 480 and 482 of two-sided tape and two outer backing members 426' and 427'. The two outer backing members, the two layers of two-sided tape, and the ductile metallic member are sandwiched together to form the laminate 478' of the band 412'. The band 412' formed by the laminate 478' comprising the backing members, the layers of two-sided tape, and the ductile metallic member is then folded so that the longitudinal end regions 418' and 420' of the band 412' are brought into an overlapping configuration to provide an opening 422' for receiving a bundle of hair as shown in FIG. 33. The longitudinal end regions 418' and 420' of the laminate 478' are then attached, such as by the pair of laterally spaced rivets 434' and the washers 492'.

Figure 34:
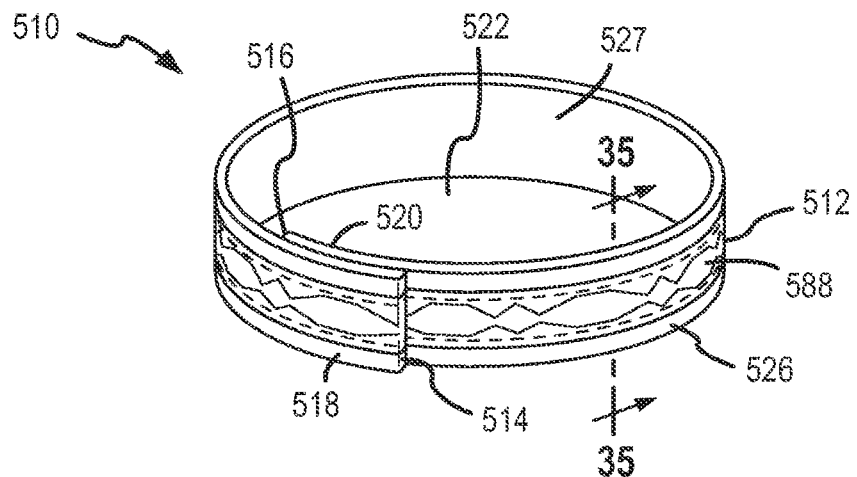
FIG. 34 is an isometric view of a hair accessory according to a sixth embodiment of the present invention.
Figure 35:
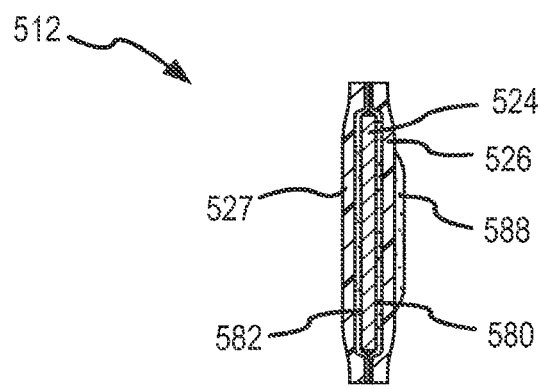
FIG. 35 is a cross-section view of the hair accessory of FIG. 34 taken along section line 35-35 of FIG. 34.

FIG. 34 is an isometric view of a hair accessory 510 according to a sixth embodiment of the present invention. FIG. 35 shows a cross-sectional view of the hair accessory 510 taken along section line 35-35 of FIG. 34. The hair accessory 510 comprises a band 512 formed by a laminate 578 comprising a ductile metallic member 524 sandwiched between a front backing member 526, a back backing member 527, layers 580 and 582 of pair of two-sided tape, and a front cover 588 extending along at least a portion of an outer surface 550 of the front backing member 426. The front cover 588, for example, may provide a decorative cover for the hair accessory 510. The band 512 comprises a first longitudinal end 514, a second longitudinal end 516, a first longitudinal end region 518, and a second longitudinal end region 520. As shown in FIG. 34, the front cover 588 of the hair accessory covers substantially the entire length of the front backing member 526 and optionally further covers an attachment device, such as a rivet 534 (see FIG. 38), attaching the longitudinal end regions 518 and 520 of the band 512. The front cover 588 may be attached to the front backing members 526 by, for example, adhesion, fusion, welding, stitching, or the like.

FIGS. 36-38 are isometric views depicting a method for assembling the hair accessory 510 of FIG. 34. As shown in FIG. 36, the front cover 588, the front and back backing members 526 and 527, the layers 580 and 582 of two-sided tape, and the ductile metallic member 524 are provided. Each layer of two-sided tape is attached along an inner surface 548 of the respective backing member, and the ductile metallic member 524 is disposed between each backing member 526 adjacent to the layers 580 and 582 of the two-sided tape. The front cover 588 is affixed along at least a portion of an outer surface 550 of the front backing members. The front cover 588, the backing members 526 and 527, the layers 580 and 582 of two-sided tape, and the ductile metallic member 524 together form the laminate 578 of the band 512 as shown in FIG. 37. The band 512 is then folded so that the longitudinal end regions 518 and 520 of the band are disposed in an overlapping configuration in which the first longitudinal end region 518 having a flap 590 formed by the front cover 588 is disposed radially external to the second longitudinal end region 520 as shown in FIG. 38. First and second longitudinal end regions 518 and 520 of the band 512 are then attached via an attachment device, such as the rivet 534. In this embodiment, the rivet comprises a first end 556, a second end 558, and a shank 560 extending from the first end 556 to the second end 558 of the rivet 534. A washer 592 may also be disposed between the inner second longitudinal end region 520 of the laminate 578 and the second end 558 of the rivet 534 around the shank 560 of the rivet. As described above, the washer 592 disperses the forces applied by the second end 558 of the rivet 534 to the ductile metallic member 524 and the backing members 526 and 527 to prevent the second end of the rivet from pulling through the inner second longitudinal end region 520 of the ductile metallic member 524 and/or the backing members 526 and 527 and separating the longitudinal end regions 518 and 520 of the band 512. Finally, the flap 590 of the front cover 588 is extended over the attachment device and the first longitudinal end region 518 of the ductile metallic member band 512 is attached to the outer surface 550 of the front backing member 526.

Figure 39:
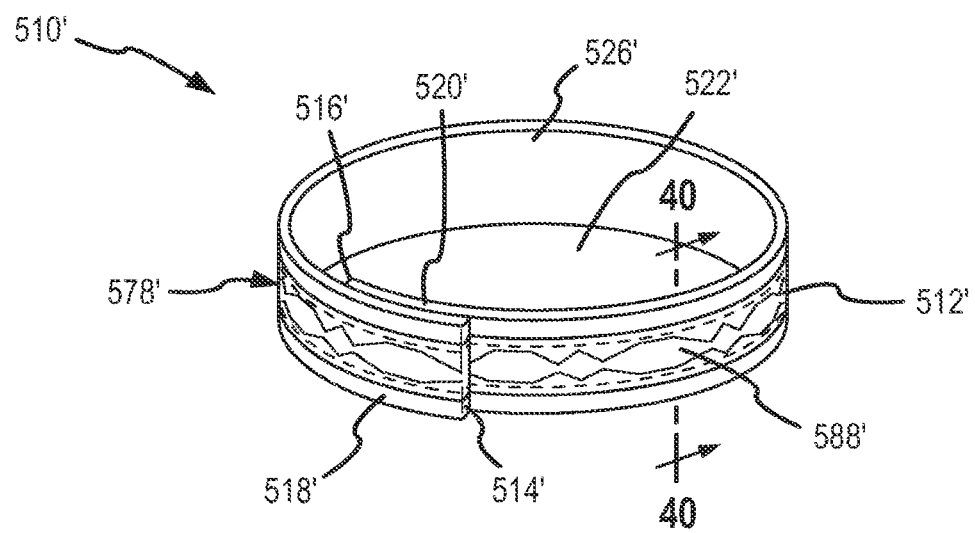
FIG. 39 is an isometric view of a variant of the hair accessory of FIG. 34.
Figure 40:
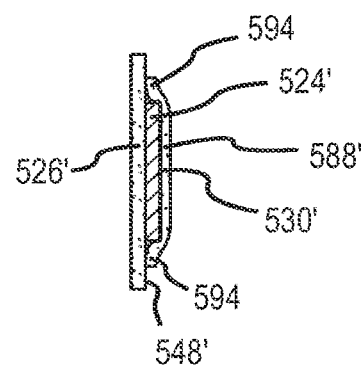
FIG. 40 is a cross-sectional view of the hair accessory of FIG. 39 taken along section line 40-40 of FIG. 39.

FIG. 39 is an isometric view of a variant 510' of the hair accessory shown in FIG. 34. FIG. 40 shows a cross-sectional view of the hair accessory 510' taken along section line 40-40 of FIG. 40. The hair accessory 510' comprises a band 512' formed by a laminate 578' comprising a ductile metallic member 524' sandwiched between a backing member 526' and a front cover 588' which may provide a decorative cover for the hair accessory. The band 512' comprises a first longitudinal end 512', a second longitudinal end 516', a first longitudinal end region 518', and a second longitudinal end region 520'. The front cover 588' of the hair accessory covers substantially the entire longitudinal length of the ductile metallic member 524' and optionally further covers an attachment device, such as a rivet 534' and a washer 592' (see FIG. 43), attaching the longitudinal end regions 518' and 520' of the band 512'. The front cover 588' may be attached to the ductile metallic member 524' and/or the backing member 526. For example, as shown in FIG. 40, the front cover 588' comprises lateral sides 594 that extend over a front surface 530' and lateral side edges 540' and 542' of the ductile metallic member 524' and attaches on an inner surface 548' of the backing member 526' outside of each lateral side edge 540' and 542' of the ductile metallic member 524'. Alternatively, or in addition, the front cover 588' may be attached to the front surface 530' of the ductile metallic member 524'.

Figure 41:
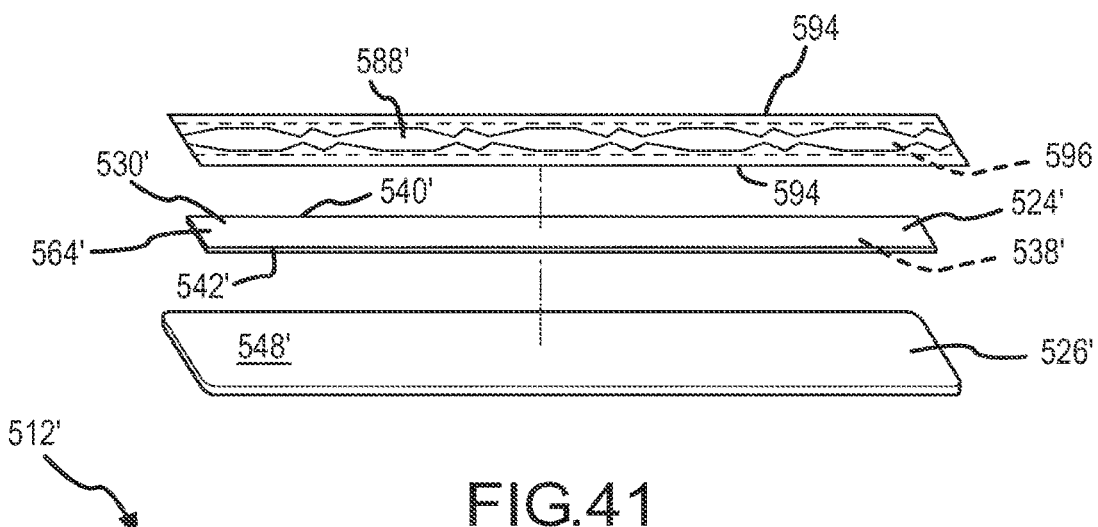
FIGS. 41-43 are isometric views depicting steps for assembling the hair accessory of FIG. 39.
Figure 42:
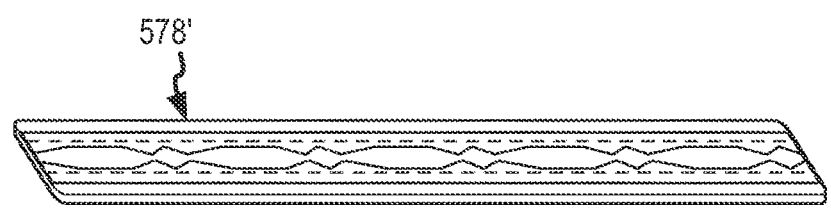
Figure 43:
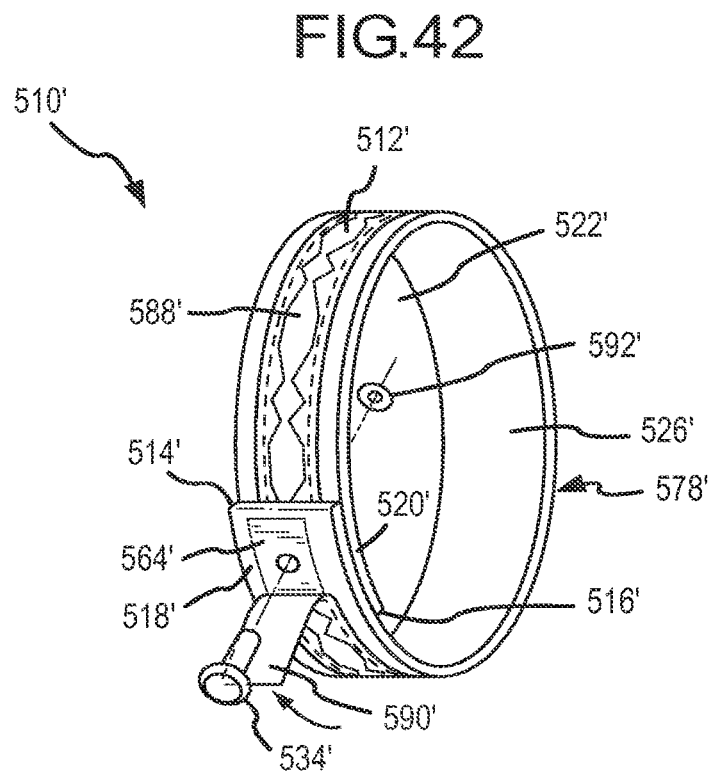

FIGS. 41-43 are isometric views depicting a method for assembling the hair accessory 510' of FIG. 39. As shown in FIG. 41, the backing member 526', the ductile metallic member 524' and the front cover 588' are provided. The ductile metallic member 524' is disposed between an inner surface 548' of the backing member 526' and a rear surface 596 of the front cover 588'. The front cover 588' comprises the lateral sides 594 extending beyond the lateral side edges 540' and 542' of the ductile metallic member 524' to the inner surface 548' of the backing member 526'. The lateral sides 594 of the front cover 588' are attached to the inner surface 548' of the backing member 526' to form the laminate 578' as shown in FIG. 42. Optionally, a bottom surface 538' of the ductile metallic member 524' may be attached to the inner surface 548' of the backing member 526' and/or a top surface 530' of the ductile metallic member 524' may be attached to the rear surface 596 of the front cover 588'. In one variant, the front cover 588' is not attached to the backing member 526' or the ductile metallic member 524' at a first longitudinal end region 518' of the band 512' to provide a flap 590' for covering an attachment device, such as the rivet 534' and the washer 592', after the longitudinal end regions 518' and 520' of the band 512' are attached. The band 512' is then folded so that longitudinal end regions 518' and 520' of the band 512' are disposed in an overlapping configuration in which the first longitudinal end region 518' having the flap 590' is disposed radially external to the second longitudinal end region 520' as shown in FIG. 43. The first and second longitudinal end regions of the band are then attached via an attachment device, such as the rivet 534' and the washer 592'. Finally, the flap 590' of the front cover 588' is extended over the attachment device and a first longitudinal end region 564' of the ductile metallic member 524' and is attached to the backing member 526' and/or the ductile metallic member 524'.

FIG. 44 is an isometric view of a hair accessory 910 according to a seventh embodiment of the present invention. FIG. 45 shows a cross-sectional view of the hair accessory 910 taken along section line 45-45 of FIG. 44. FIG. 46 shows the hair accessory 910 in a partially crimped configuration. The hair accessory 910 comprises a band 906 formed by a continuous ductile metallic member 924. Alternatively, the band 906 may be formed by overlapping a first longitudinal end and a second longitudinal end of the ductile metallic member. The band 906 of the hair accessory 910 may be covered by a thin, sheet-like, substantially rectangular backing member 926.

In the present embodiment, the thin, resilient ductile metallic member 924 is weakened in two specific, generally opposing locations on the ductile metallic member as shown in FIG. 44. By example and not limitation, the weakening of the ductile metallic member may be achieved by any combination of divots 912, scoring 914, and perforation. The weakened locations 920 on the band 906 may be spaced such that one section of the band is longer than the other. In one embodiment, the top section 904 is 3 to 5 millimeters longer than the bottom section 908 of the band 906. Further, the weakened locations 920 on the ductile metallic member may be covered with a material such as fabric or tape attached with an adhesive such as glue or tape to reinforce the weakened locations. In one embodiment, bias tape 902 is wrapped around the weakened locations 920 and attached to the band 906 with two-way tape 928 as shown in FIG. 45. FIG. 46 illustrates that the weakened locations 920 of the band 906 break when the band is crimped. The bias tape 902 enables the ends of the top section 904 and the bottom section 908 of the band 906 to remain flexibly attached after the weakened locations 920 break and also protects a user from potential sharp edges of the ductile metallic member where it has been broken at a weakened location. In one particular implementation, the top section 904 may be longer than the bottom section 908 to facilitate the interface between the top portion of the hair accessory and the bottom portion of the hair accessory when the hair accessory is fully crimped about a bundle of hair.

In one potential implementation of the embodiment shown in FIGS. 44-46, an additional protective layer (e.g., a piece of bias tape or other protective layer) may be wrapped around the ductile metallic member 924 at a location where ends of the backing member meet. In this manner, the bias tape may hide the ductile metallic member from sight in the event that ends of the backing member may begin to pull away from the ductile metallic member, especially where the bias tape is similar in color and/or appearance to the backing member. The bias tape may also protect a user from potential sharp edges of the ductile metallic member in the event that the backing member pulls away from the ductile metallic member. In one particular implementation, the bias tape may be connected to the ductile metallic member via an adhesive (e.g., two-way tape) or other connection, and the ends of the backing member may be connected to the bias tape via an adhesive (e.g., two-way tape) or other connection.

In one embodiment of the invention, the ductile metallic member may comprise cold-rolled copper or alloys thereof comprised substantially of copper, in thicknesses between about 0.010" and about 0.070", to provide a combination of ductility and resistance to flexure for the ductile metallic member. Substantially pure cold-rolled annealed copper in thicknesses between about 0.010" and about 0.070" provide an easily manually bendable member that possesses sufficient resilience to flexure to retain a bundle of hair in a desired configuration. Other metals possessing comparable ductility and resistance to flexure may also be used. The ductile metallic member may, for example, comprise a generally rectangular piece of metal having dimensions from about 7.5" by 0.0375" to about 9.25" by 0.0625".

The backing member may comprise, for example, materials such as leather, imitation leather, suede, imitation suede, velvet, vinyl (such as polyvinyl chloride material), cotton, polyester, rayon, silk, hemp, reptile skin, imitation reptile skin, open or closed-cell neoprene, polyethylene, or polyurethane, or a combination of any of these materials. The backing member may further comprise a material resistant to flexure to prevent a portion of the backing member extending beyond the ductile metallic member from being folded or bent around the ductile metallic member. The backing member may also comprise a memory, wherein when the backing member is deformed (e.g., about the ductile metallic member), the backing member is sufficiently resilient to return the deformed portions to their original position substantially parallel or coplanar with the ductile metallic member. This aspect of one embodiment of a backing member provides a flat decorative surface and, in the case where the width of the hair accessory is substantially greater in comparison to the width of the ductile metallic member, restores the flat decorative surface in the event that the hair accessory is deformed when it is placed on a wearer's hair. The backing member, however, should be insufficiently resilient to overcome the resistance to bending of the ductile metallic member.

Figure 59:
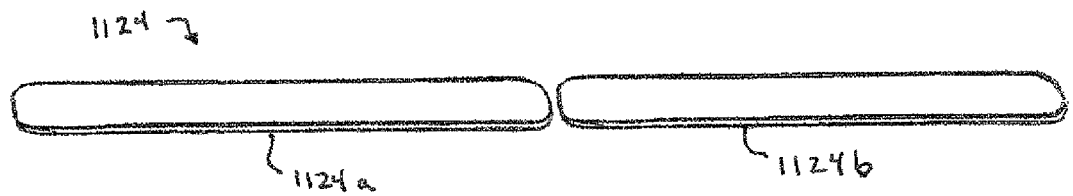
FIGS. 59-61 show a variant of the embodiment of the hair accessory shown in FIGS. 44-46
Figure 60:
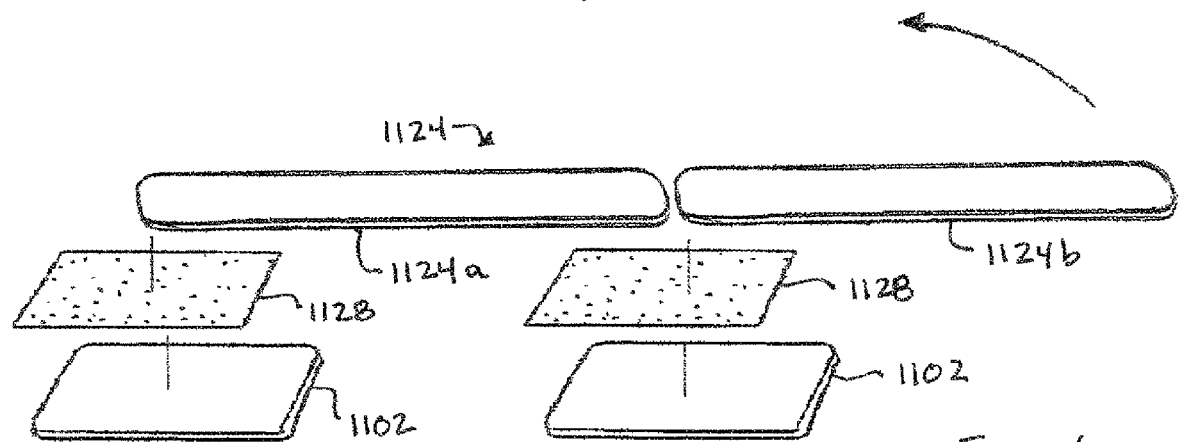
Figure 61:
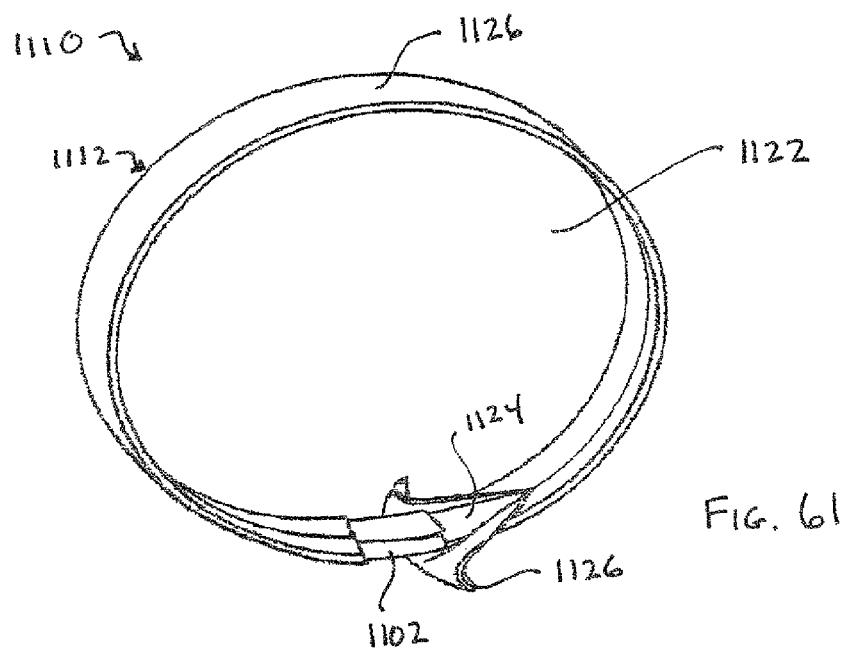

FIGS. 59-61 show a variant 1110 of the embodiment of the hair accessory shown in FIGS. 44-46 in which two portions 1124a and 1124b of a ductile metallic member 1124 are fixedly connected on either end to form a band 1112 defining an opening 1122. Although two portions are shown in this implementation, any number of portions may be fixedly attached together to define an opening for receiving a bundle of hair (in which case the first portion and the second portion are connected via the additional ductile metallic member portion(s)). In this particular implementation, longitudinal ends of the portions 1124a and 1124b are connected via an adhesive (e.g., two-sided tape 1128) and bias tape 1102 (or other type of material capable of fixedly holding the ends of the portions 1124a and 1124b with respect to each other), although other connections are possible and within ordinary skill in the art base upon this disclosure. After the portions 1124a and 1124b of the ductile metallic member 1124 are fixedly connected defining the opening 1122 for receiving a bundle of hair, a backing member (e.g., suede, velvet, or other material) may be wrapped around the ductile metallic member 1124 as described above.

Method of Styling and Method of Instructing

Figure 47:
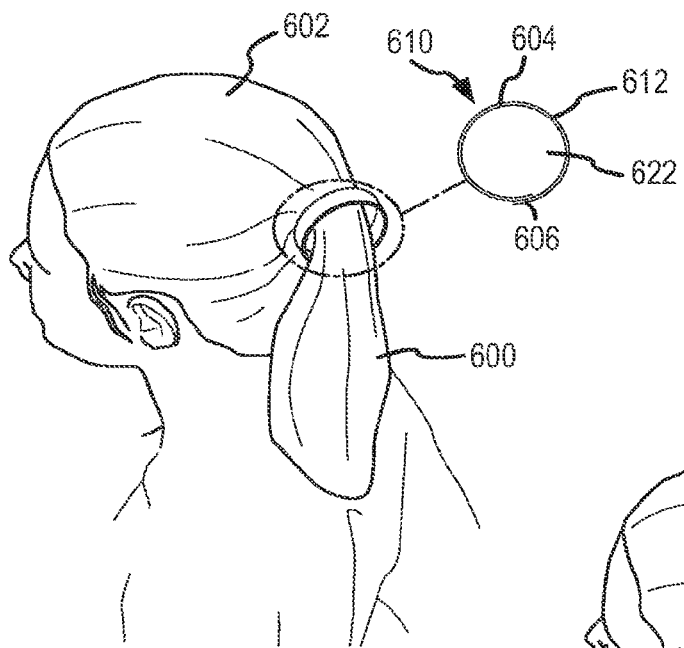
FIGS. 47-49 are isometric views depicting steps for a first method of styling hair according to the present invention.
Figure 48:
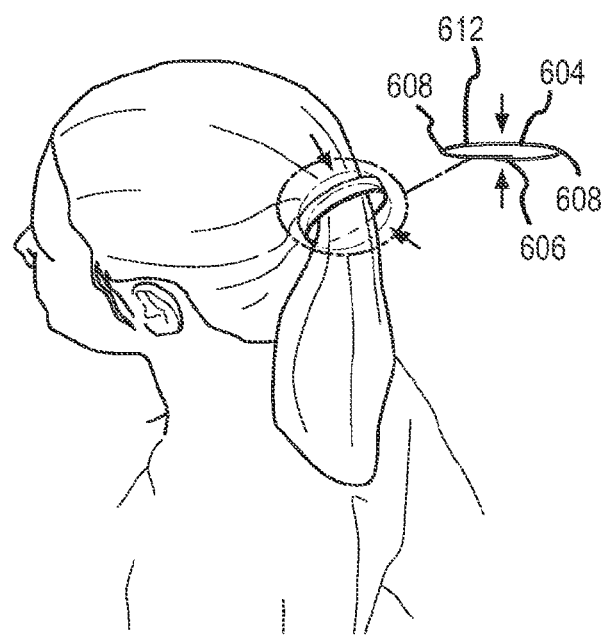
Figure 49:
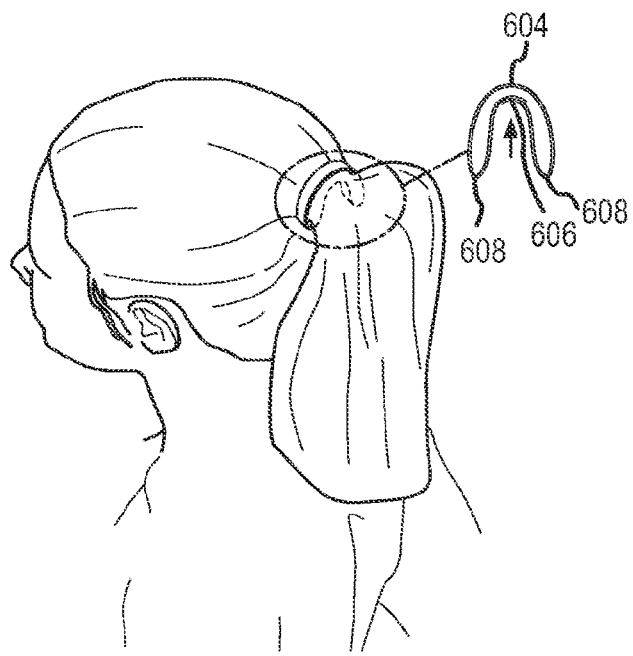

FIGS. 47-49 show steps of a first method for styling hair into a pony tail using a hair accessory 610 of the present invention and a corresponding method of instruction for showing a wearer how to style her hair according to the method. As shown in FIG. 47, a wearer's hair is formed into a bundle of hair 600 for forming the pony tail. The bundle of hair 600 is inserted through an opening 622 formed by an enclosed band 612 of a hair accessory 610, and the hair accessory 610 is held close to the head as the hair is fed through the hair accessory. As shown by the arrows of the isolation view of the hair accessory shown in FIG. 48, pressure is then applied to opposite sides 604 and 606 (e.g., top and bottom) of the hair accessory band 612, such as by one or more of the wearer's (or another person's) forefingers on the top half 604 of the band 612 and one or both of the wearer's thumbs on the bottom half 606 of the band. By applying the pressure on opposite sides of the band, the hair accessory 610 is flattened, e.g., into a generally flattened oval shape. As the band 612 is flattened, the bundle of hair 600 is flattened and spread out evenly within the band so that the hair appears uniform across the width of the hair accessory and provides a more attractive display of the hair. As in the seventh embodiment, the band 612 may break at the weakened locations as it is flattened.

Then, the wearer crimps the ends 608 of the hair accessory 610 and curls the band 612 of the hair accessory into a generally U-shaped form as shown in FIG. 49. In one embodiment of the method, for example, the wearer may grip the band of the hair accessory in both hands with the wearer reaching each hand on either side of her head to reach the hair accessory in her hair. The wearer grasps each end 608 of the hair accessory 610 between her forefingers and thumb, with her forefingers on the top half 604 and her thumbs on the bottom half 606 of the hair accessory. While holding the ends of the hair accessory and her thumbs pressing against the bottom half 606 of the hair accessory, the wearer rotates her wrists around her thumbs bringing her wrists toward each other. This bends the ends 608 toward each other and forms the generally U-shaped hair accessory shown in FIG. 49. The resulting hair style comprises a rounded, uniform pony tail.

Figure 50:
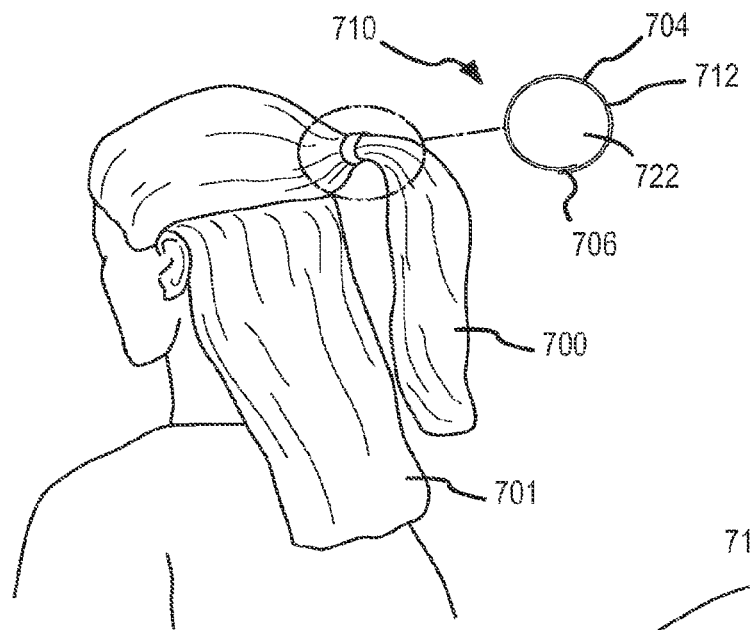
FIGS. 50-52 are isometric views depicting steps for a second method of styling hair according to the present invention.
Figure 51:
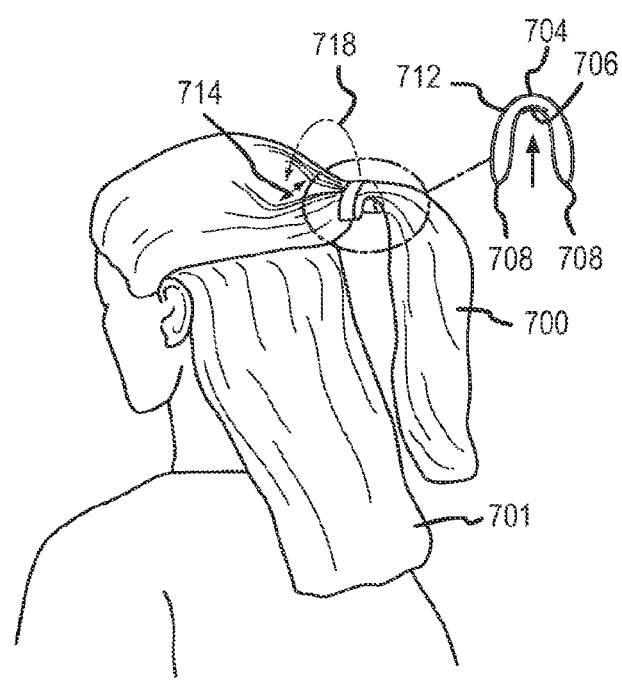
Figure 52:
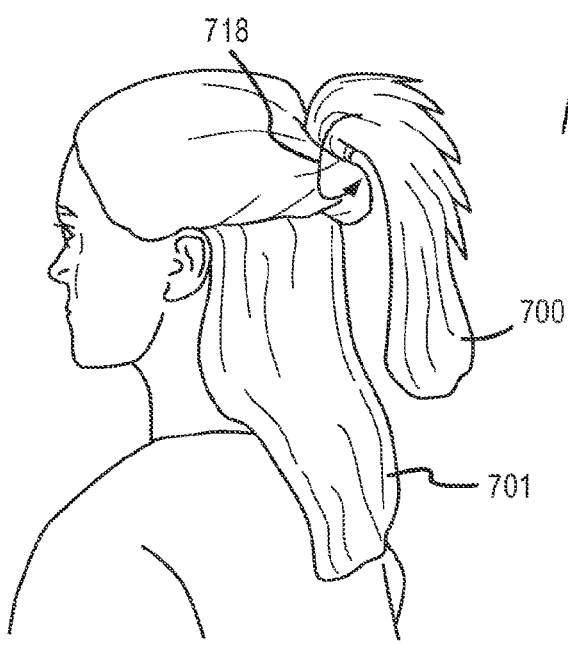

FIGS. 50-52 show steps of a second method for styling hair using a hair accessory 710 of the present invention and a corresponding method of instruction for showing a wearer how to style her hair according to the method. In this embodiment, a wearer's hair is divided into a first portion 700 and a second portion 701. The first portion 700 of the wearer's hair is grouped into a bundle and the second portion 701 located below the first portion 700 is allowed to hang freely as shown in FIG. 50. The bundle comprising the first portion 700 of hair is inserted through an opening 722 formed by an enclosed band 712 of a hair accessory 710, and the hair accessory 710 is held close to the wearer's head as the hair is fed through the hair accessory. As described above with respect to FIGS. 48 and 49 and shown in FIG. 51, the hair accessory 710 is first flattened by applying pressure to opposite sides 704 and 706 of the band 712 of the hair accessory 710. In one embodiment, for example, the wearer reaches her hands back behind her head, with each arm extending on opposite sides of her head, to grasp the hair accessory between her forefingers and thumb of each hand, and flattens the accessory by applying pressure with her forefingers to the top 704 of the band and with at least one of her thumbs to the bottom 706 of the band. Along with the hair accessory, the first portion 700 of hair forming the bundle is flattened and spread uniformly across the width of the band 712 to provide a more attractive display of the hair.

The wearer then crimps ends 708 of the hair accessory and curls the band 712 into a generally uniform, U-shaped form as shown in FIG. 51. As described above with respect to FIG. 49, the wearer may grip the hair accessory in both hands while reaching each hand on either side of her head to reach the accessory in her hair. She grasps each end 708 of the hair accessory between her forefingers and thumb, with her forefingers on the top half 704 and her thumbs on the bottom half 706 of the hair accessory. While holding the ends of the hair accessory and her thumbs pressing against the bottom half 706 of the accessory, the wearer rotates her wrists around her thumbs bringing her wrists toward each other. This bends the ends toward each other and forms the generally U-shaped hair accessory 710 shown in FIG. 51.

The first portion 700 of hair above the hair accessory 710 is then separated as shown by the lateral arrows 714 to form an opening 716 for receiving the hair accessory. The hair accessory 710 and the bundle of hair extending through the hair accessory is lifted and pulled back towards the wearer's head as shown by the arrow 718. The hair accessory is then inserted through the opening 716 of the first portion 700 of hair located above the hair accessory 710 as shown by the arrow 720 in FIG. 52. The hair accessory 710 is hidden from view within the first portion 700 of hair as shown in FIG. 52. The portion of the bundle of hair located below the hair accessory 710 is allowed to hang freely and is held away from the back of the wearer's head.

Figure 53:
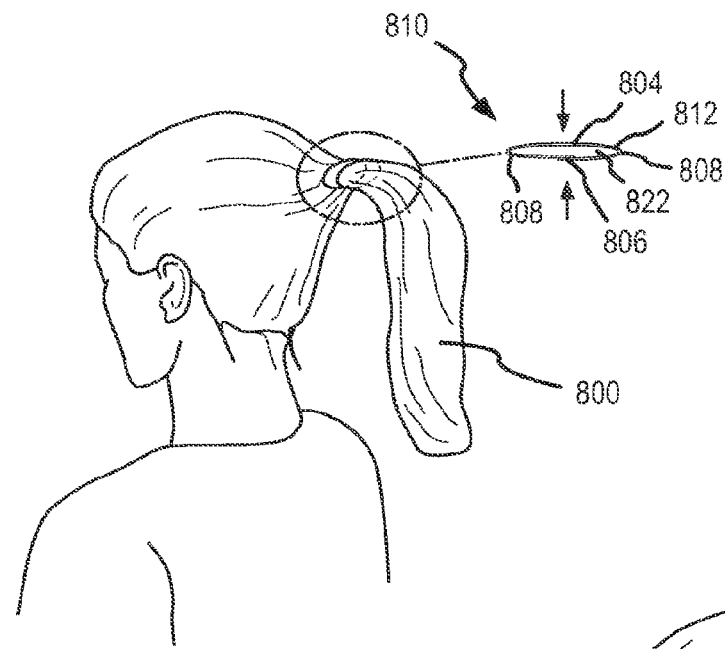
FIGS. 53-55 are isometric views depicting steps for a third method of styling hair according to the present invention.
Figure 54:
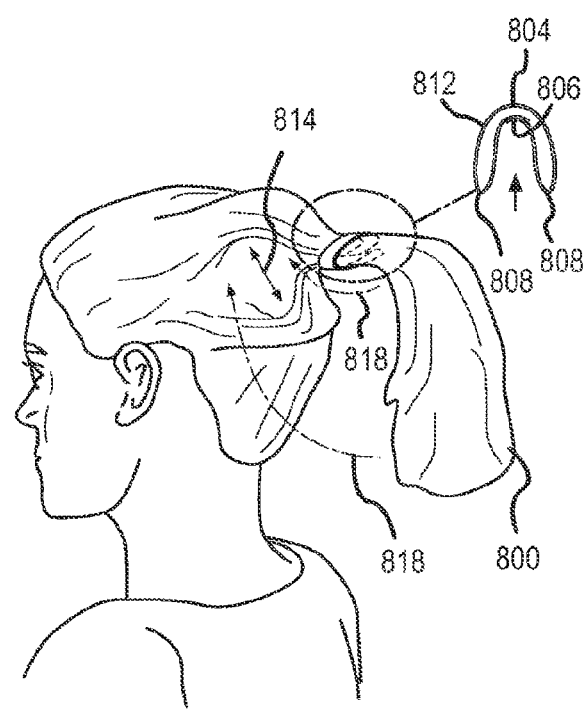
Figure 55:
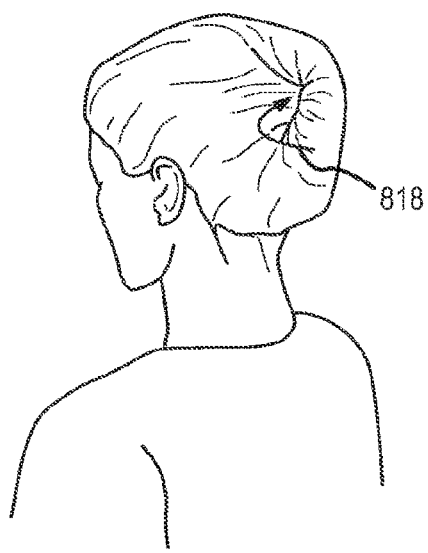

FIGS. 53-55 show steps of a third method for styling hair using a hair accessory 800 of the present invention and a corresponding method of instruction for showing a wearer how to style her hair according to the method. In this embodiment, the wearer's hair is gathered into a single bundle of hair as described above with respect to FIG. 47. The bundle 800 of hair is inserted through an opening 822 formed by an enclosed band 812 of the hair accessory, and the hair accessory is held close to the wearer's head as the hair is fed through the hair accessory 810. As shown by the arrows in the isolation view of the hair accessory 810 shown in FIG. 53, pressure is then applied to opposite sides 804 and 806 (e.g., top and bottom) of the hair accessory band, such as by at least one of the wearer's (or another person's) forefingers on the top half of the band and at least one of the wearer's thumbs on the bottom half of the band. By applying the pressure on opposite sides of the band, the hair accessory is flattened, e.g., into the generally flattened oval shape shown. As described below, the band 812 is crimped into a generally uniformed, U-shaped form as shown in FIG. 54. Then, along with the hair accessory, the bundle 800 of hair is flattened and spread uniformly across the width of the band 812 to provide a more attractive display of the hair.

Then an opening 816 in the hair located above the hair accessory 810 is made by separating the strands of hair above and to the side of the hair accessory as shown by the double-headed arrow 814 of FIG. 54. The hair accessory 810 and the bundle of hair 800 at and below the hair accessory is the rotated towards the opening 816 and inserted through the opening, tucking the hair accessory and the hair below the hair accessory inside the opening as shown by arrows 818. This method for styling hair provides a secure and decorative method for maintaining long hair up and away from the wearer's neck.

Although seven embodiments of the inventive hair accessory and three methods for styling hair and instructing others to style hair using such a hair accessory have been described above with a certain degree of particularity, those skilled in the art could make numerous alterations to the disclosed embodiments without departing from the spirit or scope of this invention. For example, the ductile metallic member of the band may be continuously formed in any of the embodiments described above. For example, the metallic member may be molded or otherwise continuously formed, such as molded (e.g., poured or injected into a mold) to form a continuous metallic member. In addition, certain features are described in various embodiments for ease of understanding. These features may be interchanged with features of other embodiments or may be added to other embodiments. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

I claim:

1. A hair accessory comprising:
    a band formed by a ductile metallic member, the ductile metallic member substantially enveloped by at least one backing member, the ductile metallic member further fixedly attached within the at least one backing member along a length of the ductile metallic member, the ductile metallic member further comprising a 0.01" to 0.07" thick strip having a first longitudinal end region and a second longitudinal end region, the ductile metallic member of the band being folded such that the first longitudinal end region overlaps the second longitudinal end region and is secured with a rivet to the second longitudinal end region where the first longitudinal end region overlaps the second longitudinal end region,
    wherein the band is adapted to be transitioned from a first configuration to a second configuration by applying pressure to opposing sides of the band with a thumb and forefinger,
        in the first configuration, the band defines an opening formed by the ductile metallic member and the fixedly attached backing member for receiving a bundle of hair, and
        in the second configuration, the ductile metallic member of the band is crimped in a generally U-shaped form about the bundle of hair to hold the fixedly attached backing of the band about the bundle of hair.

2. The hair accessory of claim 1, wherein the backing member comprises a longitudinal flap that covers at least a portion of the overlapping first and second longitudinal end regions.

3. The hair accessory of claim 1, wherein the first longitudinal end region is attached to the second longitudinal end region by the rivet and a washer.

4. The hair accessory of claim 1, wherein the first longitudinal end region is further secured to the second longitudinal end region to restrain the first longitudinal end region from rotating with respect to the second longitudinal end region.

5. The hair accessory of claim 4, wherein the first longitudinal end region is further secured to the second longitudinal end region via a piece of two-sided tape disposed between the first longitudinal end region and the second longitudinal end region.

6. The hair accessory of claim 4, wherein the first longitudinal end region is further secured to the second longitudinal end region via an adhesive disposed between the first longitudinal end region and the second longitudinal end region.

7. The hair accessory of claim 4, wherein the first longitudinal end region is further secured to the second longitudinal end region via a piece of tape wrapped around at least a portion of the first longitudinal end region and at least a portion of the second longitudinal end region.

8. The hair accessory of claim 1, wherein the backing member is wrapped around the ductile metallic member.

9. The hair accessory of claim 1, wherein the band comprises a laminate of the ductile metallic member and two backing members.

10. The hair accessory of claim 1, wherein the band further comprises a front cover disposed at least partially adjacent to the backing member.

11. The hair accessory of claim 10, wherein the front cover comprises a flap for covering the rivet.

12. The hair accessory of claim 10, wherein the backing member and the front cover together cover the ductile metallic member.

13. The hair accessory of claim 1, wherein the ductile metallic member is 7.5" to 9.25" in length.

14. The hair accessory of claim 1 wherein the backing member comprises one or more of the group comprising: leather, imitation leather, suede, imitation suede, velvet, vinyl, cotton, polyester, rayon, silk, hemp, open cell neoprene, closed cell neoprene, polyethylene and polyurethane.

15. A hair accessory comprising:
    a band comprising a ductile metallic member, the ductile metallic member substantially enveloped by at least one backing member, the ductile metallic member further fixedly attached within the at least one backing member along a length of the ductile metallic member, the band comprising a 0.01" to 0.07" thick strip having a first longitudinal end region and a second longitudinal end region, wherein the first and second longitudinal end regions overlap defining an opening for receiving a bundle of hair; a rivet that connects the first longitudinal end region to the second longitudinal end region; and
    a means for restraining the first longitudinal end region from rotating with respect to the second longitudinal end region;
    wherein the band is adapted to be transitioned from a first configuration to a second configuration by applying pressure to opposing sides of the band with a thumb and forefinger, in the first configuration, the band defines an opening formed by the ductile metallic member and the fixedly attached backing member for receiving a bundle of hair, and in the second configuration, the ductile metallic member of the band is crimped in a generally U-shaped form about the bundle of hair to hold the fixedly attached backing of the band about the bundle of hair.

16. The hair accessory of claim 15, wherein the backing member comprises a longitudinal flap that covers at least a portion of the overlapping first and second longitudinal end regions.

17. The hair accessory of claim 15, wherein the first longitudinal end region is attached to the second longitudinal end region by the rivet and a washer.

18. The hair accessory of claim 15, wherein the backing member is wrapped around the ductile metallic member.

19. The hair accessory of claim 15, wherein the band comprises a laminate of the ductile metallic member and two backing members.

20. The hair accessory of claim 15, wherein the ductile metallic member is 7.5" to 9.25" in length.

21. The hair accessory of claim 15 wherein the backing member comprises one or more of the group comprising: leather, imitation leather, suede, imitation suede, velvet, vinyl, cotton, polyester, rayon, silk, hemp, open cell neoprene, closed cell neoprene, polyethylene and polyurethane.

* * * * *